United States Patent
Nakamura et al.

(10) Patent No.: US 9,550,840 B2
(45) Date of Patent: Jan. 24, 2017

(54) PROCESS FOR PRODUCTION OF MODIFIED CONJUGATED DIENE RUBBER, MODIFIED CONJUGATED DIENE RUBBER, AND RUBBER COMPOSITION

(75) Inventors: Takahiro Nakamura, Tokyo (JP); Ryouji Tanaka, Tokyo (JP)

(73) Assignee: JSR CORPORATION, Tokyo (JP)

( * ) Notice: Subject to any disclaimer, the term of this patent is extended or adjusted under 35 U.S.C. 154(b) by 891 days.

(21) Appl. No.: 13/638,767

(22) PCT Filed: Mar. 30, 2011

(86) PCT No.: PCT/JP2011/057949
§ 371 (c)(1),
(2), (4) Date: Oct. 1, 2012

(87) PCT Pub. No.: WO2011/125698
PCT Pub. Date: Oct. 13, 2011

(65) Prior Publication Data
US 2013/0023623 A1      Jan. 24, 2013

(30) Foreign Application Priority Data

Mar. 31, 2010   (JP) ................................. 2010-080337

(51) Int. Cl.
| | | |
|---|---|---|
| C08C 19/44 | (2006.01) | |
| B60C 1/00 | (2006.01) | |
| C08K 3/04 | (2006.01) | |
| C08K 3/36 | (2006.01) | |
| C08L 15/00 | (2006.01) | |
| C08K 5/544 | (2006.01) | |

(52) U.S. Cl.
CPC ................ *C08C 19/44* (2013.01); *B60C 1/00* (2013.01); *C08K 3/04* (2013.01); *C08K 3/36* (2013.01); *C08L 15/00* (2013.01); *C08K 5/544* (2013.01)

(58) Field of Classification Search
CPC ............ B60C 1/00; C08C 19/44; C08C 19/25; C08K 3/36; C08K 3/04; C08L 15/00
See application file for complete search history.

(56) References Cited

U.S. PATENT DOCUMENTS

| 8,178,626 B2 | 5/2012 | Shibata et al. |
| 8,258,241 B2 | 9/2012 | Tanaka et al. |
| 2004/0157994 A1 | 8/2004 | Kubo et al. |
| 2004/0254301 A1 | 12/2004 | Tsukimawashi et al. |
| 2005/0020757 A1* | 1/2005 | Ozawa et al. ............... 524/492 |
| 2006/0128891 A1 | 6/2006 | Kubo et al. |
| 2010/0113683 A1 | 5/2010 | Matsumoto et al. |
| 2012/0108737 A1 | 5/2012 | Shibata et al. |
| 2012/0270997 A1 | 10/2012 | Tanaka et al. |

FOREIGN PATENT DOCUMENTS

| EP | 1 457 501 A1 | 9/2004 |
| EP | 2 130 841 A1 | 12/2009 |
| EP | 2 258 765 A1 | 12/2010 |
| JP | 8-217821 | 8/1996 |
| JP | 2003-201312 | 7/2003 |
| JP | 2004-18795 | 1/2004 |
| JP | 2005-290355 | 10/2005 |
| JP | 2008-285558 | 11/2008 |
| JP | 2010-215716 | 9/2010 |
| WO | WO 03/048216 A1 | 6/2003 |
| WO | WO 2009/113499 A1 | 9/2009 |

OTHER PUBLICATIONS

The Extended European Search Report issued Jul. 10, 2013, in Application No. / Patent No. 11765598.5-1301 / 2554553 PCT/JP2011057949.
International Search Report issued Jun. 28, 2011 in Application No. PCT/JP2011/057949.
Office Action issued Aug. 10, 2015 in European Patent Application No. 11765598.5.
Decision issued Jan. 22, 2016, in Taiwan Patent Application No. 100111344 (with partial English-language translation).
Office Action issued Mar. 4, 2016 in Canadian Patent Application No. 2,794,701.

* cited by examiner

*Primary Examiner* — Peter D Mulcahy
(74) *Attorney, Agent, or Firm* — Oblon, McClelland, Maier & Neustadt, L.L.P.

(57) ABSTRACT

To provide a producing method of conjugated diene rubber which can be used as a starting material of cross-linked rubber which is used for such as tire tread and can enhance low fuel consumption performance.
The method of producing modified conjugated diene rubber, comprising: a process step (a) wherein a conjugated diene polymer with an alkali metal or alkaline-earth metal active terminal, which polymer is obtained from polymerization of a conjugated diene compound or polymerization of a conjugated diene compound with an aromatic vinyl compound, is allowed to react with a hydrocarbyloxysilane compound having in its molecule at least one or more of each of the following functional groups (I): a hydrocarbyloxysilyl group and (II): a nitrogen-containing group formed by substituting one protective group for one hydrogen atom of a secondary amine, a tertiary amino group, an imino group, a pyridyl group to obtain a modified conjugated diene polymer with the functional group (II), and a process step (b) wherein the modified conjugated diene polymer produced in the process step (a) is mixed with an onium-forming agent.

10 Claims, No Drawings

PROCESS FOR PRODUCTION OF MODIFIED CONJUGATED DIENE RUBBER, MODIFIED CONJUGATED DIENE RUBBER, AND RUBBER COMPOSITION

CROSS-REFERENCE TO RELATED APPLICATIONS

This application is a National Stage of PCT/JP2011/057949 filed on Mar. 30, 2011. This application is based upon and claims the benefit of priority to Japanese Application No. 2010-080337 filed on Mar. 31, 2010.

TECHNICAL FIELD

The present invention relates to a method of producing modified conjugated diene rubber, modified conjugated diene rubber, and a rubber composition. More specifically, the present invention relates to a producing method of modified conjugated diene rubber wherein the method allows producing a modified conjugated diene rubber with excellent storage stability and a shape-retaining property and producing a cross-linked rubber composition with excellent workability, tensile strength, abrasion resistance, wet skid resistance and a low hysteresis-loss property; a modified conjugated diene rubber obtained by such a producing method; a rubber composition including the modified conjugated diene rubber; and a cross-linked rubber composition (e.g. a vulcanized rubber composition) produced by cross-linking (vulcanizing) the rubber composition.

BACKGROUND ART

Conjugated diene rubber (e.g. a styrene-butadiene copolymer) produced by means of an emulsion polymerization method has been known as rubber used for automobile tires. In recent times, there are expectations for on improvements in low fuel consumption performance of automobiles, various types of conjugated diene rubber capable of ensuring excellent low fuel consumption performance have been proposed.

As an example, there is a proposal of a conjugated diolefin a (co)polymer rubber (in Patent Document 1) which has features of (1) being a (co)polymer rubber of conjugated diolefin(s) or a copolymer rubber of a conjugated diolefin and an aromatic vinyl compound; (2) having primary amino groups and alkoxysilyl groups binding to a (co)polymeric chain; and features that (3) monomers having bifunctionality or more are copolymerized in a (co)polymeric chain and/or a coupling agent having bifunctionality or more is coupled to at least part of a (co)polymeric chain.

As another example of such rubber, there is a proposal of modified diene polymer rubber (in Patent Document 2) which is obtained through a process step 1 of producing an active polymer with an alkali metal terminal by polymerization of a conjugated diene monomer or a conjugated diene monomer with an aromatic vinyl monomer in a hydrocarbon solvent in the presence of an alkali metal catalyst and a process step 2 of producing modified polymer rubber by allowing the active polymer to react with a compound represented by a specific formula.

Additionally, as a method of producing a modified polymer capable of promoting interactions with silica and carbon black and improving fracture characteristics, abrasion resistance and low exothermic properties, there is a proposal of a method (Patent Document 3) in which a primary modification reaction is performed by allowing a polymer having organometallic active sites in its molecule to react with a hydrocarbyloxysilane compound at the active sites, and then a secondary modification reaction is performed by subjecting the hydrocarbyloxysilane compound to reaction via condensation reaction between hydrocarbyloxysilyl groups.

RELATED ART DOCUMENTS

Patent Documents

Patent Document 1: JP-A-2004-18795
Patent Document 2: JP-A-2005-290355
Patent Document 3: WO 03/048216 A1

SUMMARY OF THE INVENTION

Problems to be Solved by the Invention

As mentioned above, various types of conjugated diene rubber capable of ensuring excellent low fuel consumption performance of automobiles have been proposed. However, under financial circumstances, such as a steep rise in gasoline prices, and environmental circumstances including carbon dioxide emissions, further increases in low fuel consumption of automobiles have been expected. The object of the present invention is to provide a method of producing modified conjugated diene rubber utilizable as a starting material of cross-linked rubber which can be used as tires of automobiles and can enhance low fuel consumption performance of automobiles and the like.

Means for Solving the Problems

As a result of our extensive studies to solve the foregoing problems, the inventors of the present invention have found that the above aim can be achieved when modified conjugated diene rubber is produced by subjecting a conjugated diene polymer having an alkali metal or alkaline-earth metal active terminal to reaction with a specific hydrocarbyloxysilane compound, and then by mixing an onium-forming agent with the modified conjugated diene polymer as a product of the reaction, to accomplish the present invention.

More specifically, the present invention provides the following [1] to [9].

[1] A method of producing modified conjugated diene rubber, comprising:

a process step (a) wherein a conjugated diene polymer with an alkali metal or alkaline-earth metal active terminal, which polymer is obtained from polymerization of a conjugated diene compound or polymerization of a conjugated diene compound with an aromatic vinyl compound, is allowed to react with a hydrocarbyloxysilane compound having in its molecule at least one or more of each of the following functional groups (I) and (II) to obtain a modified conjugated diene polymer with the functional group (II), and a process step (b) wherein the modified conjugated diene polymer produced in the process step (a) is mixed with an onium-forming agent.

the functional group (I): a hydrocarbyloxysilyl group
the functional group (II): a nitrogen-containing group formed by substituting one protective group for one hydrogen atom of a secondary amine, a tertiary amino group, an imino group, a pyridyl group, a phosphorus-containing group formed by substituting two protective groups for two hydrogen atoms of a primary phosphine, a phosphorus-containing group formed by substituting one protective group for one hydrogen atom of a secondary phosphine, a tertiary phosphino group or a sulfur-containing group formed by substituting one protective group for one hydrogen atom of a thiol

[2] The method of producing modified conjugated diene rubber according to the above [1], wherein the process step (b) does not include a situation in which the modified conjugated diene polymer produced in the process step (a), the onium-forming agent and the hydrocarbyloxysilane compound are mixed together.

[3] The method of producing modified conjugated diene rubber according to the above [1] or [2], wherein the onium-forming agent is one or more compound(s) selected from the group consisting of metal halides, ester bodies of inorganic acids, organic acids and derivatives of organic acids.

[4] The method of producing modified conjugated diene rubber according to any one of the above [1] to [3], comprising a process step (c) wherein the mixture obtained in the process step (b) is brought into contact with water.

[5] The method of producing modified conjugated diene rubber according to any one of the above [1] to [4], wherein the modified conjugated diene rubber has an onium structure formed by the modified conjugated diene polymer.

[6] The modified conjugated diene rubber obtained by the method of producing modified conjugated diene rubber as described in any one of the above [1] to [5].

[7] A rubber composition, comprising the modified conjugated diene rubber described in the above [6], silica and/or carbon black, and a cross-linking agent.

[8] A cross-linked rubber composition produced by cross-linking of the rubber composition described in the above [7].

[9] Tires made from the cross-linked rubber composition described in the above [8].

Effect of the Invention

According to the present producing method, it is possible to obtain modified conjugated diene rubber which allows the producing of a cross-linked rubber composition with excellent workability, tensile strength, abrasion resistance, wet skid resistance and a low hysteresis-loss property. In addition, the modified conjugated diene rubber obtained is excellent in storage stability and shape-retaining property.

A cross-linked rubber composition manufactured through the use of the modified conjugated diene rubber can be used as tires of automobiles and can enhance low fuel consumption performance of automobiles and the like.

MODE FOR CARRYING OUT THE INVENTION

A method of producing modified conjugated diene rubber of the present invention comprises:

a process step (a) wherein a conjugated diene polymer with an alkali metal or alkaline-earth metal active terminal, which polymer is obtained from polymerization of a conjugated diene compound or polymerization of a conjugated diene compound with an aromatic vinyl compound, is allowed to react with a hydrocarbyloxysilane compound having in its molecule at least one or more of each of the following functional groups (I) and (II) to obtain a modified conjugated diene polymer with the functional group (II), and a process step (b) wherein the modified conjugated diene polymer produced in the process step (a) is mixed with an onium-forming agent.

the functional group (I): a hydrocarbyloxysilyl group the functional group (II): a nitrogen-containing group formed by substituting one protective group for one hydrogen atom of a secondary amine, a tertiary amino group, an imino group, a pyridyl group, a phosphorus-containing group formed by substituting two protective groups for two hydrogen atoms of a primary phosphine, a phosphorus-containing group formed by substituting one protective group for one hydrogen atom of a secondary phosphine, a tertiary phosphino group or a sulfur-containing group formed by substituting one protective group for one hydrogen atom of a thiol.

[1] Producing Method of Modified Conjugated Diene Rubber:

[Process Step (a)]

The process step (a) is a process step in which a conjugated diene polymer with an alkali metal or alkaline-earth metal active terminal, which polymer is obtained from polymerization of a conjugated diene compound or polymerization of a conjugated diene compound with an aromatic vinyl compound, is allowed to react with a hydrocarbyloxysilane compound having in its molecule at least one or more of each of the functional groups (I) and (II) described later to produce a modified conjugated diene polymer with the functional group (II).

As an example of the conjugated diene polymer having an alkali metal or alkaline-earth metal active terminal, an anionic polymer obtained by polymerizing a conjugated diene compound alone or by copolymerizing a conjugated diene compound and an aromatic vinyl compound can be mentioned.

The producing method of a conjugated diene polymer has no particular limitations except for, as mentioned above, performance of anionic polymerization by the use of a polymerization initiator derived from an alkali metal or an alkaline-earth metal. For example, as to the polymerization method, any of methods including a solution polymerization method, a vapor-phase polymerization method and a bulk polymerization method can be used, and the use of a solution polymerization method is especially preferable. Additionally, the manner of polymerization may be either a batch style or a continuous style. And the metal occupying the active site present in a molecule of the conjugated diene polymer is an alkali metal or an alkaline-earth metal. Of such metals, lithium, sodium, potassium, magnesium and barium are preferable, and especially preferred one is lithium. Any of these alkali metals and alkaline-earth metals has the same activity in terms of allowing production of a conjugated diene polymer with a metal active terminal capable of reacting with a hydrocarbyloxysilane compound. Even if some of those metals are not mentioned in Examples described later, they can be used in the present invention.

Furthermore, it is also effective to activate functional groups in the polymer by intermingling monomers containing functional group and using an alkali metal polymerization initiator. For example, it is also effective that functional group portions of a copolymer containing isobutylene units, para-methylstyrene units and para-halomethylstyrene units are converted into active sites by subjecting them to lithiation.

Examples of a compound which can be used suitably as the conjugated diene compound (also referred to as "conjugated diene monomer" hereinafter) include 1,3-butadiene, isoprene, 2,3-dimethyl-1,3-butadine, 1,3-pentadiene, 1,3-hexadiene, 1,3-heptadiene, 2,3-dimethylbutadiene, 2-phenyl-1,3-butadiene, 3-methyl-1,3-pentadiene, 1,3-hexadiene and 2-chloro-1,3-butadine etc. These diene compounds may be used alone, or any two or more of them may be used in combination. Of those compounds, particularly preferred ones are 1,3-butadiene, isoprene and 2,3-dimethyl-1,3-butadiene. Any of the conjugated diene monomers has the same activity in terms of allowing production of a conjugated diene polymer with a metal active terminal capable of reacting with a hydrocarbyloxysilane compound. Even if some of those monomers are not mentioned in Examples described later, they can be used in the present invention.

Examples of a compound which can be used suitably as the organic vinyl compound include styrene, vinyl toluenes (for example, 2-methylstyrene, 3-methylstyrene and 4-methylstyrene), α-methylstyrene, vinylxylenes (for example, 2,4-dimethylstyrene), 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl) dimethylaminoethyl ether, N,N-dimethylaminomethylstyrene, N,N-dimethylaminoethylstyrene, 2-ethylstyrene, 3-ethylstyrene, 4-ethylstyrene, 2-t-butylstyrene, 3-t-butylstyrene, 4-t-butylstyrene, vinylnaphthalene, vinylpyridine, diphenylethylene, diphenylethylene containing a tertiary amino group, tert-butoxydimethylsilylstyrene and isopropoxydimethylsilylstyrene etc. These compounds may be used alone, or any two or more of them may be used in combination. Of these compounds, styrene is especially preferred. Any of those aromatic vinyl compounds has the same activity in terms of allowing production of a conjugated diene polymer with a metal active terminal capable of reacting with a hydrocarbyloxysilane compound. Even if some of those compounds are not mentioned in Examples described later, they can be used in the present invention.

Furthermore, when copolymerization is carried out using a conjugated diene monomer and an aromatic vinyl compound, use of 1,3-butadiene and styrene, respectively is preferable. These monomers are not only available with ease but also superior in point of high living capabilities in anionic polymerization. On the other hand, when a solution polymerization method is used, the concentration of monomers in a solvent is preferably from 5 to 50 mass % and more preferably from 10 to 30 mass %, in terms of maintenance of a balance between productivity and easiness of polymerization control. Additionally, in the case of carrying out copolymerization by using a conjugated diene monomer and an aromatic vinyl compound, the aromatic vinyl compound content of a monomer mixture prepared is preferably from 3 to 55 mass % and more preferably from 5 to 50 mass %, in terms of maintenance of a balance between a low hysteresis-loss property and wet skid resistance of a cross-linked rubber composition to be obtained.

Examples of a compound which can be used as the an alkali metal or an alkaline-earth metal polymerization initiator include alkyl lithium, alkylene dilithium, lithium alkyleneimide, lithium dialkylamide, phenyl lithium, stilbene lithium, lithium naphthalene, sodium naphthalene, potassium naphthalene, n-butyl magnesium, n-hexyl magnesium, ethoxy calcium, calcium stearate, t-butoxy strontium, ethoxy barium, isopropoxy barium, ethylmercaptobarium, t-butoxy barium, phenoxy barium, diethylaminobarium, barium stearate, ketyl barium, biphenyl sodium, potassium-tetrahydrofuran complex, potassium-diethoxyethane complex, and sodium salt of α-methylstyrene tetramer. Of these compounds, organolithium compounds including alkyl lithium and lithium amide compounds including lithium alkylene imide are preferred. In the case of using an organolithium compound, a conjugated diene polymer having a hydrocarbyl group at the polymerization initiation terminal and a polymerization active site at the other terminal is produced. In the case of using a lithium amide compound, a conjugated diene polymer having a nitrogen-containing group at the polymerization initiation terminal and a polymerization active site at the other terminal is obtained. As to the alkali metals or alkaline-earth metals polymerization initiators, any of them has the same activity in terms of allowing production of a conjugated diene polymer with a metal active terminal capable of reacting with a hydrocarbyloxysilane compound. Even if some of those initiators are not mentioned in Examples described later, they can be used in the present invention.

As the organolithium compound, what has a hydrocarbyl group containing 1 to 20 carbon atoms is suitable, with examples including methyl lithium, ethyl lithium, n-propyl lithium, iso-propyl lithium, n-butyl lithium, sec-butyl lithium, tert-octyl lithium, n-decyl lithium, phenyl lithium, 2-naphthyl lithium, 2-butylphenyl lithium, 4-phenylbutyl lithium, cyclohexyl lithium, a product of reaction between diisopropenylbenzene and butyl lithium, t-butyl lithium, n-hexyl lithium, benzyl lithium, phenyl lithium, stilbene lithium, 1,4-dilithobutane, 1,3,5-trilithiobenzene, a product of reaction between n-butyl lithium, 1,3-butadiene and divinylbenzene, a product of reaction between n-butyl lithium and polyacetylene, 4-cyclopentyl lithium, 1,2-dilithiomethane, 1,4-dilithiobutane, 1,4-dilithio-2-ethylcylohexane and 1,3,5-trilithiobenzene etc. Of these compounds, n-butyl lithium and sec-butyl lithium are preferable in terms of their easiness of acquisition and high capabilities in initiating polymerization.

On the other hand, examples of the lithium amide compound include lithium hexamethyleneimide, lithium pyrrolidide, lithium piperidide, lithium heptamethyleneimide, lithium dodecamethyleneimide, lithium morphilide, lithium dimethylamide, lithium diethylamide, lithium dibutylamide, lithium dipropylamide, lithium diisopropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide, 3-[N,N-bis(trimethylsilyl)]-1-propyl lithium, 3-[N,N-bis(trimethylsilyl)]-2-methyl-1-propyl lithium, 3-[N,N-bis(trimethylsilyl)]-2,2-dimethyl-1-propyl lithium, 4-[N,N-bis(trimethylsilyl)]-1-butyl lithium, 5-[N,N-bis(trimethylsilyl)-1-pentyl lithium, 8-[N,N-bis(trimethylsilyl)-1-octyl lithium, 3-(2,2,5,5-tetramethyl-2,5-disila-1-azacyclopentane)-1-propyl lithium, 2-methyl-3-(2,2,5,5-tetramethyl-2,5-sila-1-azacyclopentane)-1-propyl lithium, 2,2-dimethyl-3-(2,2,5,5-tetramethyl-2,5-disila-1-azacyclopentane)-1-propyl lithium, 4-(2,2,5,5-tetramethyl-2,5-disila-1-azacyclopentane)-1-butyl lithium and 6-(2,2,5,5-tetramethyl-2,5-disila-1-azacyclopentane)-1-hexyl lithium etc. Of these compounds, in terms of their effects of interactions with carbon black and silica and their high capabilities of initiating polymerization, cyclic lithium amides including lithium hexamethyleneimide, lithium pyrrolidide, lithium piperidide, lithium heptamethyleneimide and lithium dodecamethyleneimide are preferable, and lithium hexamethyleneimide, lithium pyrrolidide and lithium piperidide are more preferable.

As to these lithium amide compounds, although those generally prepared in advance from secondary amines and lithium compounds are often used for polymerization, it is also possible to prepare them in polymerization systems (in situ). Additionally, it is appropriate that such a polymerization initiator is used in an amount of 0.2 to 20 mmols per 100 g of monomer.

One example of a concrete method adopted to manufacture a conjugated diene polymer by using the lithium compound as mentioned above and carrying out anionic polymerization is a method of subjecting a diene monomer or both a diene monomer and an aromatic vinyl compound to anionic polymerization in a reaction-inactive organic solvent such as a hydrocarbon solvent, e.g. an aliphatic, alicyclic or aromatic hydrocarbon compound, by using as a polymerization initiator the lithium compound as recited above in the presence of a randomizer used in accordance with desire. In accordance with such a method, intended conjugated diene polymers can be obtained.

As the hydrocarbon solvent, those containing 3 to 8 carbon atoms are preferable and examples thereof include propane, n-butane, isobutene, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene and cyclohexene etc. These solvents may be used alone, or any two or more of them may be used in combination.

On the other hand, the randomizer used in accordance with desire refers to a compound having the action of controlling the microstructure of a conjugated diene polymer, such as the action of increasing the vinyl bonds (1,2-bonding) of butadiene portions in a butadiene-styrene copolymer or the vinyl bonds (1,2-bonding and 3,4-bonding) in an isoprene polymer, or a compound having the action of controlling compositional distribution of monomer units in a conjugated diene polymer, such as the action of randomizing butadiene units and styrene units in a butadiene-styrene copolymer. The randomizer as defined above has no particular limitation, and any of those chosen as appropriate from known compounds which have generally been used as randomizers can be used. Examples of such a randomizer include ethers and tertiary amines, such as dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, N,N,N',N'-tetramethylethylenediamine, 1,2-dipiperidinoethane, ethylene glycol dibutyl ether, ethylene glycol dimethyl ether, diethyl ether, dioxane, trimethylamine, quinuclidine, potassium-t-amylate, potassium-t-butylate, triphenylphosphine, tetrahydropyran, dibutyl ether, ethylene glycol diethyl ether, diethylene glycol diethyl ether, diphenyl ether, anisole, tripropylamine, tributylamine, N,N-diethylaniline and quinoline. These randomizers may be used alone, or any two or more of them may be used in combination.

In the case of intending to enhance reactivity of such a polymerization initiator as described above, or in the case of intending to randomly arrange an aromatic vinyl compound at its introduction into a polymer or to add a simple chain or long chain of aromatic vinyl compounds to a polymer, a potassium compound may be added together with the polymerization initiator. Examples of a potassium compound added together with the polymerization initiator include potassium alkoxides and potassium phenoxides such as potassium isoproxide, potassium t-butoxide, potassium t-amyloxide, potassium n-heptaoxide, potassium benzyloxide and potassium phenoxide; potassium salts of isovalerianic acid, caprylic acid, lauric acid, palmitic acid, stearic acid, oleic acid, linolenic acid, benzoic acid, phthalic acid, 2-ethylhexanoic acid and the like; potassium salts of organic sulfonic acids, such as dodecylbenzenesulfonic acid, tetradecylbenzenesulfonic acid, hexadecylbenzenesulfonic acid and octadecylbenzenesulfonic acid; and potassium salts of partial esters of organic phosphorous acids, such as diethyl phosphite, diisopropyl phosphite, diphenyl phosphite, dibutyl phosphite and dilauryl phosphite.

Such a potassium compound is preferably added in an amount of 0.005 to 0.5 mole per gram-atomic equivalent weight of alkali metal or alkaline-earth metal of a polymerization initiator. When the amount added is smaller than 0.005 mole, addition of the potassium compound sometimes brings no effects (improvement in reactivity of polymerization initiators; randomization of aromatic vinyl compounds; or addition of a simple chain or long chain of aromatic vinyl compounds). On the other hand, when the amount added is greater than 0.5 mole, not only decrease in polymerization activity, which situation results in a significant reduction in productivity, but also a decrease in modification efficiency in modification reaction with hydrocarbyloxysilane compounds occur.

The temperature of the polymerization reaction is preferably from −20° C. to 150° C. and more preferably from 0° C. to 120° C. The polymerization reaction can be carried out under generated pressure, and it is preferable in ordinary cases that operations be performed under pressure which is enough to substantially keep the monomer(s) in a liquid phase. More specifically, depending on the individual substances polymerized, the polymerization medium used and the polymerization temperature chosen, higher pressure in comparison with generated pressure can be adopted if desired. Such pressure can be attained in an appropriate way, such as pressurization of a reaction vessel with a gas inactive in polymerization reaction.

In this polymerization, all that are used as starting materials participating in the polymerization, including a polymerization initiator, a solvent and a monomer, are preferably those wherein reaction-inhibiting substances, such as water, oxygen, carbon dioxide and protonic compounds are removed. Additionally, in the case of obtaining a polymer as an elastomer, the glass transition temperature (Tg) of the polymer or copolymer obtained is preferably from −90° C. to 0° C. which is determined by a differential thermal analysis. It is difficult to obtain a polymer having a glass transition temperature lower than −90° C. Additionally, when the polymer obtained has a glass transition temperature higher than 0° C., since the viscosity thereof becomes too high in the region of room temperature, the handling thereof sometimes becomes difficult.

As to the functional group (I) (namely a hydrocarbyloxysilyl group) in a hydrocarbyloxysilane compound, what has at least two hydrocarbyloxy groups is preferably used in terms of an ability to react with a conjugated diene polymer having an alkali metal or alkaline-earth metal active terminal. Examples of the hydrocarbyloxy group include an alkoxy group having a C1-20 alkyl moiety, an aryloxy group having a C1-20 aryl moiety, an allyloxy group having a C1-20 alkyl moiety and an aralkyloxy group having a C1-20 aralkyl moiety. Among them, an alkoxy group having a C1-20 alkyl moiety or an aryl moiety is preferable. When two or more hydrocarbyloxy groups are present, each of these groups may be the same as or different.

As to the functional group (I), it is essential that at least one or more than one functional group (I) be present in a molecule. When two or more functional groups (I) are present, these functional groups may be same or different.

The functional group (II) in a hydrocarbyloxysilane compound is a nitrogen-containing group formed by substituting one protective group for one hydrogen atom of a secondary amine, a tertiary amino group, an imino group, a pyridyl group, a phosphorus-containing group formed by substituting two protective groups for two hydrogen atoms of a primary phosphine, a phosphorus-containing group formed by substituting one protective group for one hydrogen atom of a secondary phosphine, a tertiary phosphino group or a sulfur-containing group formed by substituting one protective group for one hydrogen atom of a thiol.

As to the functional group (II), it is essential that at least one or more than one functional group (II) be present in a molecule. When two or more functional groups (II) are present, these functional groups may be same or different.

Additionally, the term protective group in the functional group (II) means a group protected from an alkali metal or alkaline-earth metal active terminal of a conjugated diene polymer.

Hydrocarbyloxysilane compounds may be used alone, or any two or more of them may be used in combination.

Examples of a compound having a hydrocarbyloxysilyl group as well as a nitrogen-containing group formed by substituting one protective group for one hydrogen atom of a secondary amine or a tertiary amino group can include N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-p-phenylenediamine, N-[3-(triethoxysilyl)-propyl]-N,N'-diethyl-N'-trimethylsilyl-p-phenylenediamine, 3-[3-(trimethylsilylethylamino)-1-pyrrolidinyl]-propyl-methyldiethoxysilane, 3-[3-(tirmethylsilylpropylamino)-1-pyrrolidinyl]-propyl-triethoxysilane, N-[3-(diethoxymethylsilyl)-propyl]-N-ethyl-N'-(2-ethoxyethyl)-N'-trimethylsilyl-ethane-1,2-diamine, N-[3-(tripropoxysilyl)-propyl]-N-propyl-N'-(2-ethoxyethyl)-N'-triethylsilyl-p-phenylenediamine, N-[2-(diethoxymethylsilyl)-1-methylethyl]-N-ethyl-N'-(2-diethylamino-ethyl)-N'-triethylsilyl-ethane-1,2-diamine, N-[3-(triethoxysilyl)-propyl]-N-ethyl-N'-(2-diethylamino-ethyl)-N'-triethylsilylethane-1,2-diamine, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino)propyltributoxysilane, 3-(4-trimethylsilyl-1-piperazino)propylmethyldiethoxysilane, 3-(4-trimethylsilyl-1-piperazino)propyltrimethoxysilane, 3-(3-trimethylsilyl-1-imidazolidinyl)propylethyldiethoxysilane, 3-(3-trimethylsilyl-1-imidazolidinyl)propyltriethoxysilane, 3-(3-trimethylsilyl-1-hexahydropyrimidinyl)propylmethyldimethoxysilane, 3-(3-trimethylsilyl-1-hexahydropyrimidinyl)propyltriethoxysilane, 4-(4-trimethylsilyl-1-piperazinyl)butyltriethoxysilane, N-[2-(trimethoxysilyl)-ethyl]-N,N',N'-trimethylethane-1,2-diamine, N-[2-(dimethoxymethylsilyl)-ethyl]-N-ethyl-N',N'-dimethylethane-1,2-diamine, N-[3-(trimethoxysilyl)-propyl]-N,N',N'-trimethylpropane-1,3-diamine, N-[3-(dimethoxymethylsilyl)-propyl]-N-ethyl-N',N'-dimethylpropane-1,3-diamine, N-[3-(triethoxysilyl)-propyl]-N,N',N'-triethyl-2-methylpropane-1,3-diamine, N-[3-(dimethoxymethylsilyl)-propyl]-2,N,N',N'-tetramethylpropane-1,3-diamine, N-(2-dimethylaminoethyl)-N'-[2-(trimethoxysilyl)-ethyl]-N,N'-dimethylethane-1,2-diamine, N-[2-(diethoxypropylsilyl)-ethyl]-(3-ethoxypropyl)-N,N'-dimethylethane-1,2-diamine, N-[2-(trimethoxysilyl)-ethyl]-N'-methoxymethyl-N,N'-dimethylethane-1,2-diamine, N-[2-(trimethoxysilyl)-ethyl]-N,N'-dimethyl-N'-(2-trimethylsilylethyl)-ethane-1,2-diamine, N-[2-(triethoxysilyl)-ethyl]-N,N'-diethyl-N'-(2-dibutylmethoxysilylethyl)-ethane-1,2-diamine, 1-[3-(triethoxysilyl)-propyl]-4-methylpiperazine, 1-[3-(diethoxyethylsilyl)-propyl]-4-methylpiperazine, 1-[3-(trimethoxysilyl)-propyl]-4-methylpiperazine, 1-[3-(diethoxymethylsilyl)-propyl]-4-methylpiperazine, 1-[3-(dimethoxymethylsilyl)-propyl]-4-methylpiperazine, 1-[3-(trimethoxysilyl)-propyl]-3-methylimidazolidine, 1-[3-(diethoxyethylsilyl)-propyl]-3-ethylimidazolidine, 1-[3-(triethoxysilyl)-propyl]-3-methylhexahydropyrimidine, 1-[3-(dimethoxymethylsilyl)-propyl]-3-methylhexahydropyrimidine, 3-[3-(tributoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 1-(2-ethoxyethyl)-3-[3-(trimethoxysilyl)-propyl]-imidazolidine, 2-{3-[3-(trimethoxysilyl)-propyl]-tetrahydropyrimidine-1-yl}-ethyldimethylamine, 2-(trimethoxysilyl)-1,3-dimethylimidazolidine, 2-(diethoxyethylsilyl)-1,3-diethylimidazolidine, 2-(triethoxysilyl)-1,4-diethylpiperazine, 2-(dimethoxymethylsilyl)-1,4-dimethylpiperazine, 5-(triethoxysilyl)-1,3-dipropylhexahydropyrimidine, 5-(diethoxyethylsilyl)-1,3-diethylhexahydropyrimidine, 2-[3-(2-dimethylaminoethyl)-2-(ethyldimethoxysilyl)-imidazolidine-1-yl]-ethyldimethylamine, 5-(trimethoxysilyl)-1,3-bis-(2-methoxyethyl)-hexahydropyrimidine, 5-(ethyldimethoxysilyl)-1,3-bis-(2-trimethylsilylethyl)-hexahydropyrimidinyl)-1,3-diethylimidazolidine, 2-(3-diethoxyethylsilyl-propyl)-1,3-diethylimidazolidine, 2-(3-triethoxysilyl-propyl)-1,4-diethylpiperazine, 2-(3-dimethoxymethylsilyl-propyl)-1,4-dimethylpiperazine, 5-(3-triethoxysilyl-propyl)-1,3-dipropylhexahydropyrimidine, 5-(3-diethoxyethylsilyl-propyl)-1,3-diethylhexahydropyrimidine, 2-[3-(2-dimethylaminoethyl)-2-(3-ethyldimethoxysilyl-propyl)-imidazolidine-1-yl]-ethyldimethylamine, 5-(3-trimethoxysilyl-propyl)-1,3-bis-(2-methoxyethyl)-hexahydropyrimidine, 5-(3-ethyldimethoxysilyl-propyl)-1,3-bis-(2-trimethylsilylethyl)-hexahydropyrimidine, 3-dimethylaminopropyltrimethoxysilane, 3-diethylaminopropyltrimethoxysilane, 3-dimethylaminopropyltriethoxysilane, 3-diethylaminopropyltriethoxysilane, 3-ethylmethylaminopropyltrimethoxysilane, 3-ethylmethylaminopropyltriethoxysilane, 3-dimethylaminopropylmethyldimethoxysilane, 3-diethylaminopropylmethyldimethoxysilane, 3-dimethylaminopropylethyldimethoxysilane, 3-diethylaminopropylethyldimethoxysilane, 3-dimethylaminopropyldimethylmethoxysilane, 3-dimethylaminopropyldiethylmethoxysilane, 3-diethylaminopropyldimethylmethoxysilane, 3-diethylaminopropyldiethylmethoxysilane, 3-ethylmethylaminopropylmethyldimethoxysilane, 3-methyl-3-ethylaminopropylethyldimethoxysilane, 3-dimethylaminopropylmethyldiethoxysilane, 3-diethylaminopropylmethyldiethoxysilane, 3-dimethylaminopropylethyldiethoxysilane, 3-diethylaminopropylethyldiethoxysilane, 3-dimethylaminopropyldimethylethoxysilane, 3-dimethylaminopropyldiethylethoxysilane, 3-diethylaminopropyldimethylethoxysilane, 3-diethylaminopropyldiethylethoxysilane, 3-ethylmethylaminopropylmethyldiethoxysilane, 3-ethylmethylaminopropylethyldiethoxysilane, 3-di(methoxymethyl)aminopropyltrimethoxysilane, 3-di(methoxyethyl)aminopropyltrimethoxysilane, 3-di(methoxymethyl)aminopropyltriethoxysilane, 3-di(mthoxyethyl)aminopropyltriethoxysilane, 3-di(ethoxyethyl)aminopropyltrimethoxysilane, 3-di(ethoxymethyl)aminopropyltrimethoxysilane, 3-di(ethoxyethyl)aminopropyltriethoxysilane, 3-di(ethoxymethyl)aminopropyltriethoxysilane, 3-di(trimethylsilyl)aminopropyltrimethoxysilane, 3-di(trimethylsilyl)aminopropyltriethoxysilane, 3-di(t- butyldimethylsilyl)aminopropyltrimethoxysilane, 3-di(t-butyldimethylsilyl)aminopropyltriethoxysilane, 3-di(trimethylsilyl)aminopropylmethyldimethoxysilane, 3-di(trimethylsilyl)aminopropylmethyldiethoxysilane, 3-di(t-butyldimethylsilyl)aminopropylmethyldimethoxysilane, 3-di(t-butyldimethylsilyl)aminopropylmethyldiethoxysilane, 3-di(trimethylsilyl)aminopropyldimethylmethoxysilane, 3-di(trimethylsilyl)aminopropyldimethylethoxysilane, 3-di(t-butyldimethylsilyl)aminopropyldimethylmethoxysilane, 3-di(t-butyldimethylsilyl)aminopropyldimethylethoxysilane, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, bis[3-(triethoxysilyl)propyl]trimethylsilylamine, bis[3-(trimethoxysilyl)propyl]trimethylsilylamine, and a compound having an ethanolamine structure or the like and a hydrocarbyloxysilyl group.

Preferred ones among these compounds include N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis[3-(triethoxysilyl)propyl]trimethylsilylamine and bis[3-(trimethoxysilyl)propyl]trimethylsilylamine.

Examples of a compound having a hydrocarbyloxysilyl group as well as an imino or pyridyl group can include N-(1,3-dimethylbutylidene)-3-(triethoxysilyl)-1-propaneamine, N-(1-methylpropylidine)-3-(triethoxysilyl)-1-propaneamine, N-ethylidene-3-(triethoxysilyl)-1-propaneamine, N-(1-methylpropylidine)-3-(trimethoxysilyl)-1-propaneamine, N-(4-N,N-dimethylaminobenzylidene)-3-(triethoxysilyl)-1-propaneamine and N-(cyclohexylidene)-3-(triethoxysilyl)-1-propaneamine, and the trimethoxysilyl compounds, methyldiethoxysilyl compounds and ethyldimethoxysilyl compounds corresponding to those triethoxysilyl compounds; and further N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, 3-hexamethyleneiminopropylethyldiethoxysilane and a compound having both a benzimidazole, melamine, amidine or like structure and a hydrocarbyloxysilyl group. Preferred ones among those compounds include N-(1,3-dimethylbutylidene)-3-(triethoxysilyl)-1-propaneamine, N-(1-methylprolylidene)-3-(triethoxysilyl)-1-propaneamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole and N-(3-triethoxysilylpropyl)-4,5-imidazole.

Examples of a compound having a hydrocarbyloxysilyl group as well as a phosphorus-containing group formed by substituting two protective groups for two hydrogen atoms of a primary phosphine, a phosphorus-containing group formed by substituting one protective group for one hydrogen atom of a secondary phosphine, a tertiary phosphino group or a sulfur-containing group formed by substituting one protective group for one hydrogen atom of a thiol can include P,P-bis(trimethylsilyl)phosphinopropylmethyldimethoxysilane, P,P-bis(trimethylsilyl)phosphinopropyltrimethoxysilane, P,P-bis(trimethylsilyl)phosphinopropyltriethoxysilane, P,P-bis(trimethylsilyl)phosphinopropylmethyldiethoxysilane, P,P-bis(trimethylsilyl)phosphinoethyltrimethoxysilane, P,P-bis(trimethylsilyl)phosphinoethyltriethoxysilane, P,P-bis(trimethylsilyl)phosphinoethylmethyldimethoxysilane, P,P-bis(trimethylsilyl)phosphinoethylmethyldiethoxysilane, 3-dimethylphosphinopropyltrimethoxysilane, 3-diethylphosphinopropyltrimethoxysilane, 3-dimethylphosphinopropyltriethoxysilane, 3-diethylphosphinopropyltriethoxysilane, 3-ethylmethylphosphinopropyltrimethoxysilane, 3-ethylmethylphosphinopropyltriethoxysilane, 3-dimethylphosphinopropylmethyldimethoxysilane, 3-diethylphosphinopropylmethyldimethoxysilane, 3-dimethylphosphinopropylethyldimethoxysilane, 3-diethylphosphinopropylethyldimethoxysilane, 3-dimethylphosphinopropyldimethylmethoxysilane, 3-dimethylphosphinopropyldiethylmethoxysilane, 3-diethylphosphinopropyldimethylmethoxysilane, 3-diethylphosphinopropyldiethylmethoxysilane, 3-ethylmethylphosphinopropylmethyldimethoxysilane, 3-ethylmethylphosphinopropylethyldimethoxysilane, 3-dimethylphosphinopropylmethyldiethoxysilane, 3-diethylphosphinopropylmethyldiethoxysilane, 3-dimethylphosphinopropylethyldiethoxysilane, 3-diethylphosphinopropylethyldiethoxysilane, 3-dimethylphosphinopropyldimethylethoxysilane, 3-dimethylphosphinopropyldiethylethoxysilane, 3-diethylphosphinopropyldimethylethoxysilane, 3-diethylphosphinopropyldiethylethoxysilane, 3-ethylmethylphosphinopropylmethyldiethoxysilane, 3-ethylmethylphosphinopropylethyldiethoxysilane, 3-diphenylphosphinopropyltrimethoxysilane, 3-diphenylphosphinopropyltriethoxysilane, 3-diphenylphosphinopropylmethyldimethoxysilane, 3-diphenylphosphinopropylmethyldiethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane and S-trimethylsilylmercaptoethylmethyldiethoxysilane.

Preferred ones among these compounds are 3-diphenylphosphinopropyltrimethoxysilane, 3-diphenylphosphinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane and S-trimethylsilylmercaptopropylmethyldiethoxysilane.

A conjugated diene polymer having an alkali metal or alkaline-earth metal active terminal is allowed to react with a hydrocarbyloxysilane compound, and thereby binding is formed between the site of the alkali metal or alkaline-earth metal active terminal and the functional group (I) (hydrocarbyloxysilyl group) of the hydrocarbyloxysilane compound, and the modified conjugated diene polymer having the rest of the functional group (I) and the functional group (II) can be obtained. Additionally, any of hydrocarbyloxysilane compounds can react with conjugated diene polymers having metal active terminals including an alkali metal or an alkaline-earth metal, and has the same activity in terms of reaction or interaction with carbon black and/or silica which can function as a reinforcing agent when the conjugated diene polymers are converted into rubber compositions and from the viewpoint of imparting an excellent property of low in hysteresis loss in case of conversion into cross-linked rubber compositions. Thus, even if some of such compounds are not mentioned in Examples described later, they can be used in the present invention.

Such modification reaction as to introduce a hydrocarbyloxysilane compound into an alkali metal or alkaline-earth metal active terminal of a conjugated diene polymer can be performed e.g. in solution reaction (wherein the solution may be a solution containing un reacted monomers which are used at the time of polymerization). The modification reaction has no particular limitation as to its form, and it may be carried out by using a batch-type reactor or it may be carried out in a continuous mode by using an instrument such as a multistage continuous reactor or an in-line mixer. Additionally, it is appropriate that the modification reaction is carried out in advance of various operations required for isolation of the polymer after completion of polymerization reaction, including solvent removal treatment, water treatment and heat treatment.

The amount of a hydrocarbyloxysilane compound used in this modification reaction is preferably from 0.1 mole equivalent to less than 1.2 mole equivalent, preferably from 0.3 mole equivalent to 1.0 mole equivalent, with respect to the active site of the conjugated diene polymer obtained by anionic polymerization. When the amount used is smaller than 0.1 mole equivalent, the progress of modification reaction is not satisfactory, and the ability to disperse a reinforcing agent cannot be improved to a sufficient degree. As a result thereof, in case of conversion into a cross-linked rubber composition, there is possibility that the composition obtained is inferior in tensile strength, abrasion resistance, wet skid resistance and low hysteresis-loss property.

In this connection, the method for adding a hydrocarbyloxysilane compound as a modifier has no particular limitation, and examples thereof include a method of addition by one operation, a method of addition in fractional amounts and a method of continuous addition. Of these methods, the method of addition by one operation is preferable. Additionally, the hydrocarbyloxysilane compound may be added in the form of a solution containing as solvent a conjugated diene monomer as recited in the paragraph 0011 of this specification, an aromatic vinyl compound as recited in the paragraph 0012, a hydrocarbon solvent as recited in the paragraph 0019, a randomizer as recited in the paragraph 0020, and so on.

As a temperature for the modification reaction, the temperature for polymerization of a conjugated diene compound can be utilized just as it is. To be specific, a temperature range of 0° C. to 120° C. is preferable. And the range of 20° C. to 100° C. is more preferable. A drop in temperature tends to cause an increase in viscosity of polymers, whereas a rise in temperature tends to cause deactivation of polymerization active terminals. Therefore, the temperatures falling outside the numerical range specified above are unsuitable. In addition, the reaction time in the modification reaction is preferably from 1 minute to 5 hours and is more preferably from 2 minutes to one hour.

When a conjugated diene polymer is produced, a coupling agent can be added in combination with a hydrocarbyloxysilane compound. Examples of the coupling agent include the following ones. Additionally, the coupling agent is added at the stage of modifying the conjugated diene polymer with the hydrocarbyloxysilane compound.

Examples of the coupling agent allowed to react on a polymerization active terminal in combination with a hydrocarbyloxysilane compound include at least one compound selected from the group consisting of (a) isocyanate compounds and/or isothiocyanate compounds, (b) amide compounds and/or imide compounds, (c) ketone compounds substituted by pyridyl and/or vinyl compounds substituted by pyridyl, (d) silicon compounds, (e) ester compounds, (f) ketone compounds, (g) tin compounds, (h) epoxy compounds, (i) phosphoric ester compounds, (j) acid anhydride group-containing compounds, (k) arylvinyl group-containing compounds and (l) halogenated carbon group-containing compounds.

As to isocyanate compounds or isothiocyanate compounds as the ingredient (a) among those compounds, suitable examples thereof can include 2,4-tolylenediisocyanate, 2,6-tolylenediisocyanate, diphenylmethane diisocyanate, diphenylethane diisocyanate, polymeric-type diphenylmethane diisocyanate (C-MDI), isophorone diisocyanate, hexamethylene diisocyante, 1,3,5-benzenetriisocyanate and phenyl-1,4-diisothiocyanate etc.

Suitable examples of amide compounds or imide compounds as the ingredient (b) can include amide compounds such as succinamide, phthalamide, N,N,N',N'-tetramethylphthalamide, oxamide, N,N,N',N'-tetramethyloxamide, adipic acid bisdimethylamide and polymethacrylic acid dimethylamide, and imide compounds such as succinimide, N-methylsuccinimide, maleimide, N-methylmaleimide, phthalimide and N-methylphthalimide etc.

Suitable examples of ketone compounds substituted by pyridyl or vinyl compounds substituted by pyridyl as the ingredient (c) can include dibenzoylpyridine, diacetylpyridine and divinylpyridine etc.

Suitable examples of silicon compounds as the ingredient (d) can include dibutyldichlorosilane, methyltrichlorosilane, methyldichlorosilane, tetrachlorosilane (silicon tetrachloride), silicon tetrabromide, silicon tetraiodide, monochlorotrimethoxysilane, monobromotrimethoxysilane, dichlorodimethoxysilane, dibromodimethoxysilane, trichloromethoxysilane, tribromomethoxysilane, hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, 1,6-bis(trichlorosilyl)hexane, triethoxymethylsilane, triphenoxymethylsilane, trimethoxysilane, methyltriethoxysilane, tetramethoxysilane, tetraethoxysilane, tetrabutoxysilane, 3-acetylpropoxytrimethoxysilane, N-(1,3-dimethylbutylidene)-3-(triethoxysilyl)-1-propaneamine, N-(1,3-dimethylbutylidene)-3-(tributoxysilyl)-1-propaneamine, N-(1-methylpropylidene)-3-(triethoxysilyl)-1-propaneamine, N-ethylidene-3-(triethoxysilyl)-1-propaneamine, N-(3-triethoxysilylpropyl)-4,5-dihydroimidazole, 3-chloropropoxytrimethoxysilane, 4,5-epoxyheptyldimethoxysilane and bis(triethoxysilylpropyl)tetrasulfide etc.

Suitable examples of ester compounds as the ingredient (e) can include dimethyl adipate, diethyl adipate, dimethyl terephthalate, diethyl terephthalate, dimethyl phthalate, dimethyl isophthalate, diethyl malonate, diethyl phthalate, diethyl glutarate and diethyl maleate etc.

Suitable examples of ketone compounds as the ingredient (f) can include N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone and 4,4'-diacetylbenzophenone etc.

Suitable examples of tin compounds as the ingredient (g) can include tetrachlorostannate, tetrabromostannate, trichlorobutylstannate, trichloromethylstannate, trichloroethylstannate, trichlorophenylstannate, trichlorooctylstannate, dibromodimethylstannate, dichlorodimethylstannate, dichlorodibutylstannate, dichlorodioctylstannate, 1,2-bis(trichlorostannyl)ethane, 1,2-bis(methyldichlorostannyle-thane), 1,4-bis(trichlorostannyebutane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate and dibutyltin bislaurate etc.

Suitable examples of epoxy compounds as the ingredient (h) can include polyglycidyl ethers of polyhydric alcohol, such as ethylene glycol diglycidyl ether and glycerin triglycidyl ether, polyglycidyl ethers of aromatic compounds having two or more phenyl groups, such as diglycidylated bisphenol A, polyepoxy compounds such as 1,4-diglycidylbenzene, 1,3,5-triglycidylbenzene and polyepoxidated liquid polybutadiene, epoxy group-containing tertiary amines such as 4,4'-diglycidyl-diphenylmethylamine and 4,4'-diglycidyl-dibenzylmethylamine, glycidylamino compounds such as diglycidylaniline, diglycidyl-ortho-toluidine, tetraglycidyl-meta-xylenediamine, tetraglycidylaminodiphenylmethane, tetraglycidyl-p-phenylenediamine, diglycidylaminomethylcyclohexane and tetraglycidyl-1,3-bisaminomethylcyclohexane, and compounds having epoxy groups and other functional groups, such as 3-glycidoxypropyltrimethoxysilane, 3-glycidoxypropyltriethoxysilane, 3-glycidoxypropyltributoxysilane, epoxy-modified silicones, epoxidated soybean oil and epoxidated linseed oil etc.

Suitable examples of phosphoric ester compounds as the ingredient (i) can include polyhalophosphine compounds such as trichlorophosphine and tribromophosphine, phosphite compounds such as trisnonylphenyl phosphite, trimethyl phosphite and triethyl phosphite, trimethyl phosphate and triethy phosphate.

Suitable examples of acid anhydride group-containing compounds as the ingredient (j) can include pyromellitic anhydride and a styrene-maleic anhydride copolymer etc.

Suitable examples of arylvinyl group-containing compounds as the ingredient (k) can include divinylbenzene, diisopropenylbenzene and a divinylbenzene oligomer etc.

Suitable examples of halocarbyl group-containing compounds as the ingredient (l) can include trichloropropane, tribromopropane and tetrachlorobutane etc.

These compounds made to react on polymerization active terminals in combination with hydrocarbyloxysilane compounds may be used alone, or two or more of them may be used in combination.

Such a coupling agent is used in an amount of one mole or below, preferably from 0.1 to 0.5 mole, in terms of the amount of a coupling-capable substituent in the coupling agent, per gram-atomic equivalent weight of alkali metal or alkaline-earth metal constituting a polymerization initiator used. When the amount used is greater than 1 mole, the reaction rates of hydrocarbyloxysilane compounds are lowered, and there is possibility that in case of conversion into cross-linked rubber compositions, excellent properties of low in hysteresis loss and so on cannot be obtained.

[Process Step (b)]

The process step (b) is a process step in which the modified conjugated diene polymer obtained in the process step (a) is mixed with an onium-forming agent.

As to the onium-forming agent, at least one compound selected from the group including metal halides, ester bodies of inorganic acids, organic acids and derivatives of organic acids etc. can be described as an example thereof.

To be more specific, examples of such a compound include metal halides such as silicon halide compounds, tin halide compounds, aluminum halide compounds, titanium halide compounds, zirconium halide compounds, germanium halide compounds, gallium halide compounds and zinc halide compounds, inorganic acids such as hydrofluoric acid, hydrochloric acid, hydrobromic acid, hydroiodic acid, sulfuric acid, nitric acid, carbonic acid and phosphoric acid, salts of inorganic acids such as potassium fluoride, tetramethylammonium fluoride and tetra-n-butylammonium fluoride, ester bodies of inorganic acids such as sulfuric ester, phosphoric ester, carbonic acid ester and nitric ester, and organic acids and derivatives of organic acids, such as carboxylic acids, carboxylic acid anhydrides, carboxylic acid halides, carboxylic acid esters, organic phosphorous or phosphoric acids, organic phosphoric acid halides, organic phosphates, organic sulfonic acids, organic sulfonic acid halides, organic sulfonates, organic sulfinic acids, organic sulfinic acid halides, organic sulfinates and thioic acids etc. These compounds may be used alone, or any two or more of them may be used in combination.

Examples of each compound as the onium-forming agent include the following.

The metal halides include silicon tetrachloride, tin tetrachloride, trimethylsilyl chloride, dimethyldichlorosilane, methyltrichlorosilane, methyldichlorosilane, diethylaluminum chloride, ethylaluminum sesquichlorid, ethylaluminum dichloride, titanium tetrachloride, titanocene dichloride, zirconium tetrachloride, zirconocene dichloride, germanium tetrachloride, gallium trichloride and zinc chloride etc.

The ester bodies of inorganic acids include diethyl sulfate, dimethyl sulfate, magnesium laureth sulfate, trimethyl phosphate, triethyl phosphate, tributyl phosphate, 2-ethylhexyl phosphate, triphenyl phosphate, tricresyl phosphate, dimethyl carbonate, diethyl carbonate, ethylene carbonate, propylene carbonate, nitrocellulose, nitroglycerin and nitroglycol etc.

The carboxylic acids include formic acid, acetic acid, maleic acid, propionic acid, isobutyric acid, 2-methylbutyric acid, octylic acid, 2-methylpentanoic acid, cyclohexanecarboxylic acid, isononanoic acid, undecylenic acid, oleic acid, lauric acid, myristic acid, palmitic acid, behenic acid, stearic acid, isostearic acid, naphthenic acid, monochloroacetic acid, methoxyacetic acid, 2-chloropropionic acid, 3-chloropropionic acid, α-bromopropionic acid, cyanoacetic acid, acrylic acid, methacrylic acid, vinylacetic acid, crotonic acid, sorbic acid, glyoxylic acid, pyruvic acid, levulinic acid, phenylacetic acid, p-methoxyphenylacetic acid, 2-chlorophenylacetic acid, 4-chlorophenylacetic acid, phenoxyacetic acid, α-phenoxypropionic acid, cinnamic acid, benzoic acid, o-toluoylic acid, m-toluoylic acid, p-toluoylic acid, p-t-butylbenzoic acid, o-chlorobenzoic acid, 2,4-dichlorobenzoic acid, 4-chloro-3-nitrobenzoic acid, α-naphthoic acid, o-benzoylbenzoic acid, thioglycolic acid, β-mercaptopropionic acid, ferulic acid, 3-chloromandelic acid, 2-chloromandelic acid, mandelic acid, benzilic acid, p-hydroxyphenylacetic acid, p-hydroxyphenylacetic acid, p-hydroxyphenylpropionic acid, β-oxynaphthoic acid, 1,4-dihydroxy-2-naphthoic acid, 1,4-dihydroxy-2-naphthoic acid, o-nitrobenzoic acid, m-nitrobenzoic acid, p-nitrobenzoic acid, o-hydroxybenzoic acid, m-hydroxybenzoic acid, p-hydroxybenzoic acid, salicylic acid, thiosalicylic acid, 6-hydroxy-2-naphthoic acid, 4-hydroxybiphenyl-4'-carboxylic acid, tetrahydro-5-oxo-2-furancarboxylic acid, 2-hydroxymethylbutyric acid, lactic acid, dimethylolpropionic acid, dimethylolbutanoic acid, gluconic acid, isoleucine, alanine, glycine, β-alanine, threonine, serine, isoserine, tyrosine, o-aminobenzoic acid, m-aminobenzoic acid, p-aminobenzoic acid, tryptophan, 3-carbamoyl-pyrazinecarboxylic acid, picolinic acid, nicotinic acid, isonicotinic acid, 2-chloronicotinic acid, quinaldinic acid, citrazinic acid, pyrazinemonocarboxylic acid, oxalic acid, malonic acid, succinic acid, glutaric acid, adipic acid, methylsuccinic acid, sebacic acid, dodecanedioic acid, brassylic acid, fumaric acid, itaconic acid, citraconic acid, isophthalic acid, terephthalic acid, 1,4-naphthalenedicarboxylic acid, 2,6-naphthalenedicarboxylic acid, dibenzoyltartaric acid, trimellitic acid, trimesic acid, trimellitic acid anhydride, pyromellitic acid, pyromellitic acid anhydride, dimer acid, 3,3'-dithiodipropionic acid, 3,3'-thiodipropionic acid, thiomalic acid, tartaric acid, citric acid, malic acid, 5-hydroxyisophthalic acid, iminodiacetic acid, 1,2-cyclohexanediaminetetraacetic acid, ethylenediaminetetraacetic acid, chelidamic acid, 2-aminoadipic acid, 2-amino-3-(carboxymethylthio)-propionic acid, glutamic acid, aspartic acid and cystine etc.

The carboxylic acid anhydrides include anhydrides of the carboxylic acids recited above, such as isobutyric anhydride, itaconic anhydride, succinic anhydride, acetic anhydride, citraconic anhydride, propionic anhydride, maleic anhydride, butyric anhydride and phthalic anhydride etc.

The carboxylic acid halides include halides of the carboxylic acids recited above, such as halogenated acetyl, halogenated propionyl, halogenated butyryl, halogenated benzoyl and cyclohexyl halide. Here the term halogenated means fluorinated, chlorinated, brominated or iodinated and the term halide means fluoride, chloride, bromide or iodide (in the following description these terms have the same meanings as the above, respectively).

The carboxylic acid esters include ester bodies of the carboxylic acids recited above, such as methyl acetate, ethyl acetate, methyl propionate, methyl propionate, methyl methacrylate, dimithyl maleate and methyl benzoate etc.

The organic phosphoric (or phosphorous) acids include compounds represented by the following formula (1).

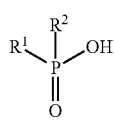

(1)

(In the above formula (1), $R^1$ is a univalent C1-30 hydrocarbon group or a group represented by —$OR^3$. $R^2$ is a hydrogen atom, a hydroxyl group, a univalent C1-30 hydrocarbon group or a group represented by —$OR^3$. Here $R^3$ is a univalent C1-30 hydrocarbon group.)

To be more specific, the compounds include methylphosphonic acid, ethylphosphonic acid, phenylphosphonic acid, dimethylphosphonic acid, diethylphosphonic acid, diphenylphosphonic acid, methylphenylphosphonic acid, methylphosphinic acid and phenylphosphinic acid etc.

The organic phosphoric acid halides include compounds represented by the following formula (2).

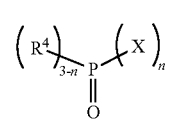

(2)

(In the above formula (2), $R^4$ is a univalent C1-30 hydrocarbon group, X is a halogen atom, and n is 1 or 2. When plural $R^4$ is present, each $R^4$ may be same as or different)

To be more specific, the compounds include halogen compounds of organic phosphoric acids, such as dimethylphosphinic acid halide, diethylphosphinic acid halide, diphenylphosphinic acid halide, ethylmethylphosphinic acid halide, methylphosphonic acid dihalide and phenylphosphonic acid dihalide.

The organic phosphoric acid esters include compounds represented by the following formula (3).

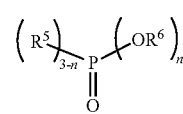

(3)

(In the above formula (3), $R^5$ is a univalent C1-30 hydrocarbon group and $R^6$ is a univalent C1-30 hydrocarbon group. When plural $R^5$ is present, $R^5$ may be same or different. When plural $R^6$ is present, $R^6$ may be same as or different. Additionally, $R^5$ and $R^6$ may be same or different. n is an integer of 1 to 3.)

To be more specific, the compounds include ester bodies of the organic phosphoric acids, such as methyl dimethylphosphinate, ethyl diphenylphosphinate, dimethyl methylphosphonate, diphenyl phenylphosphonate, trimethyl phosphate, triphenyl phosphate, methyldiphenyl phosphate and ethylmethylphenyl phosphate etc.

The organic sulfonic acids include compounds represented by the following formula (4).

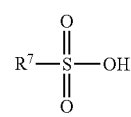

(4)

(In the above formula (4), $R^7$ is a univalent C1-30 hydrocarbon group, or a hydroxyl group. Additionally, a hydrogen atom of $R^7$ may be substituted with a halogen atom.)

To be more specific, the compounds include methanesulfonic acid, ethanesulfonic acid, benzenesulfonic acid, trifluoromethanesulfonic acid and p-toluenesulfonic acid.

The organic sulfonic acid halides include compounds represented by the following formula (5).

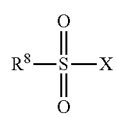

(5)

(In the above formula (5), $R^8$ is a univalent C1-30 hydrocarbon group and X is a halogen atom. Additionally, a hydrogen atom of $R^8$ may be substituted with a halogen atom.)

To be more specific, the compounds include halides of the organic sulfonic acids recited above, such as methanesulfonyl halide, ethanesulfonyl halide, trifluoromethanesulfonyl halide and p-toluenesulfonyl halide.

The organic sulfonic acid esters include compounds represented by the following formula (6).

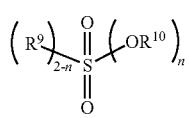
(6)

(In the above formula (6), $R^9$ is a univalent C1-30 hydrocarbon group, and $R^{10}$ is a univalent C1-30 hydrocarbon group. When plural $R^9$ is present, each $R^9$ may be same or different. When plural $R^{10}$ is present, each $R^{10}$ may be same or different. Additionally, $R^9$ and $R^{10}$ may be same as or different. n is an integer of 1 or 2.)

To be more specific, the compounds include methyl methanesulfonate, ethyl benzenesulfonate, isopropyl p-toluenesulfonate, dimethyl sulfonate, methylphenyl sulfonate and diphenyl sulfonate etc.

The organic sulfinic acids are compounds represented by the following formula (7).

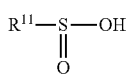
(7)

(In the above formula (7), $R^{11}$ is a univalent C1-30 hydrocarbon group or a hydroxyl group. Additionally, a hydrogen atom of $R^{11}$ may be substituted with a halogen atom.)

To be more specific, the compounds include sulfinic acid compounds such as methanesulfinic acid, ethanesulfinic acid, p-toluenesulfinic acid and trifluoromethanesulfinic acid etc.

The organic sulfinic acid halides are compounds represented by the following formula (8).

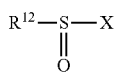
(8)

(In the above formula (8), $R^{12}$ is a univalent C1-30 hydrocarbon group, and X is a halogen atom. Additionally, a hydrogen atom of $R^{12}$ may be substituted with a halogen atom.)

To be more specific, the compounds include halides of the organic sulfinic acids recited above, such as methanesulfinyl halide, ethanesulfinyl halide, p-toluenesulfinyl halide and trifluoromethanesulfinyl halide etc.

The organic sulfinic acid esters are compounds represented by the following formula (9).

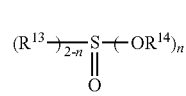
(9)

(In the above formula (9), $R^{13}$ is a univalent C1-30 hydrocarbon group, and $R^{14}$ is a univalent C1-30 hydrocarbon group. When several $R^{13}$ is present, each $R^{13}$ may be same or different. When several $R^{14}$ is present, each $R^{14}$ may be same or different. Additionally, $R^{13}$ and $R^{14}$ may be same as or different. n is an integer of 1 or 2.)

To be more specific, the compounds include ester bodies of the sulfinic acids recited above, such as methyl benzenesulfinate, diphenyl sulfinate and ethyl methanesulfinate.

The thioic acids are compounds represented by the following formula (10).

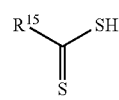
(10)

(In the above formula (10), $R^{15}$ is a univalent C1-30 hydrocarbon group.)

To be more specific, the compounds include dithioacetic acid.

Any of these organic acids have same activity in terms of allowing conversion of the functional group (II) into the onium, and even if some of those acids are not mentioned in Examples described later, they can be used in the present invention.

Any of those onium-forming agents has same activity in terms of allowing conversion of the functional group (II) into the onium, and even if some of those agents are not mentioned in Examples described later, they can be used in the present invention.

The mixing of the modified conjugated diene polymer obtained in the process step (a) with an onium-forming agent can be carried out e.g. in a state of solution. The mixing has no particular limitation as to its style, and it may be carried out by the use of a batch-type blender or it may be carried out in a continuous mode by the use of an instrument such as a multistage continuous blender or an in-line mixer.

The amount of an onium-forming agent used is preferably at least 1.0 mole equivalent and preferably at least 1.5 mole equivalent, with respect to the active site of the conjugated diene polymer obtained by anionic polymerization. When the amount used is smaller than 1.0 mole equivalent, there is possibility that the progress of conversion into onium is not satisfactory and the rubber obtained is inferior in shape-retaining property.

The method for adding an onium-forming agent has no particular limitation, and examples thereof include a method of addition by one operation, a method of addition in fractional amounts and a method of continuous addition. Of these methods, the method of addition by one operation is preferred to the others. On the other hand, the onium-forming agent may be added in the form of a solution containing as a solvent such a hydrocarbon solvent as recited in the paragraph 0019 of this specification, such a randomizer as recited in the paragraph 0020 of this specification, and so on.

As a temperature for mixing an onium-forming agent with a modified conjugated diene polymer obtained in the process step (a), the polymerization temperature for the conjugated diene polymer can be utilized just as it is. Specifically, a preferable range of mixing temperatures is from 0° C. to 120° C. Additionally, the range of 20° C. to 100° C. is more preferable. A drop in temperature tends to cause an increase in viscosity of polymers, whereas a rise in temperature tends to cause degradation of polymerization active terminals. Therefore, temperatures outside the numerical range specified above are unsuitable. In addition, the mixing time is preferably from 1 minute to 5 hours and more preferably from 2 minutes to one hour.

In this connection, in the method of producing the present modified conjugated diene rubber, the modified conjugated diene polymer can be collected by performing operations publicly known in producing conjugated diene polymers, namely solvent removal (e.g. steam stripping) and drying operations, after addition of an onium-forming agent.

Moreover, it is preferable in the present invention that the process step (b) does not to include a situation that the hydrocarbyloxysilane compound is mixed with the modified conjugated diene polymer obtained in the process step (a) and the onium-forming agent. In other words, it is appropriate for the hydrocarbyloxysilane compound used not to be mixed in the modified conjugated diene polymer obtained in the process step (a), and besides it is appropriate that no hydrocarbyloxysilane compound be added in the process step (b).

[Process Step (c)]

The process step (c) is a process step of bringing the mixture obtained in the process step (b) into contact with water.

By bringing the onium-forming agent into contact with water, the modified conjugated diene polymer forms an onium structure, and modified conjugated diene rubber with the onium structure can be obtained.

As to the method of bringing the mixture obtained in the process step (b) into contact with water, there is no particular limitation. For instance, it is appropriate to adopt (i) a method of, after the process step (b), mixing water into the polymer solution by direct addition, (ii) a method of, after the process step (b), dissolving water into an organic solvent in which both water and organic solvents are soluble, such as alcohol; adding the resulting solution to the polymer solution; and mixing these solutions, or (iii) a method of mixing water with the polymer solution and/or the polymer at the same time as solvent removal in a step of steam stripping subsequent to the process step (b). Of these methods, the method (iii) of mixing water with the polymer solution and/or the polymer at the same time as solvent removal in a step of steam stripping subsequent to the process step (b) is especially preferable from the viewpoint of efficient formation of onium structure.

Additionally, the temperature during the reaction is preferably from 30° C. to 150° C. and more preferably from 80° C. to 120° C.

As to the modified conjugated diene polymer to be used in this process step, a polymer solution obtained at the time of preparation of the modified conjugated diene polymer may be used as it is without solvent removal. On the other hand, the conjugated diene polymer obtained by subjecting the polymer solution to solvent removal e.g. by steam stripping etc. and further to drying may be dissolved again in a solvent, such as cyclohexane etc.

[2] Modified Conjugated Diene Rubber:

The present modified conjugated diene rubber is a modified conjugated diene rubber obtained by the hitherto described method for producing modified conjugated diene rubber. Such modified conjugated diene rubber is moderate in Mooney viscosity, superior in shape stability and excellent in workability. The Mooney viscosity (ML1+4, 100° C.) of the modified conjugated diene rubber is preferably from 30 to 150 and more preferably from 40 to 120. When the Mooney viscosity (ML1+4, 100° C.) is lower than 30, the shape stability is on a downward trend. On the other hand, when the rubber has a Mooney viscosity (ML1+4, 100° C.) higher than 150, the workability thereof degrades, and it sometimes becomes difficult to knead the rubber with a compounding agent.

Additionally, when its Mooney viscosity is too high, the rubber is generally oil-extended with extension oil so as to have Mooney viscosity in the above-specified range.

As the extension oil, aromatic oil, naphthene oil, paraffin oil or an aromatic-oil substitute with a PCA content lower than 3 mass % as measured by Method IP 346 is suitable for use. The extension oil may be used in an arbitrary amount. It is usually used in an amount of 10 to 50 parts by mass with respect to 100 parts by mass of the polymer. In general, 20 to 37.5 parts by mass of extension oil is used. In the classification by producing process of oil, T-DAE (Treated Distillate Aromatic Extract) oil, T-RAE (Treated Residual Aromatic Extract) oil, MES (Mild Extract Solvate) oil, RAE (Residual Aromatic Extract) oil and the like can be used favorably.

[3] Rubber Composition:

The rubber composition as an exemplary embodiment of the present invention is a rubber composition which includes as a rubber ingredient the modified conjugated diene polymer as mentioned above. Details thereof are described below.

[3-1] Rubber Ingredients:

The modified conjugated diene rubber included in the rubber composition of the exemplary embodiment is a rubber which includes the modified conjugated diene polymer as mentioned above. The percentage of modified conjugated diene polymer content in the modified conjugated diene rubber is preferably 20 mass % or more, more preferably 30 mass % or more and particularly preferably 40 mass % or more. When a percentage of the content is adjusted to 20 mass % or more, the cross-linked rubber composition obtained can have improvements in mechanical properties, such as tensile strength and elongation by stretching, wet skid resistance, low hysteresis-loss property and abrasion resistance.

Additionally, the modified conjugated diene rubber may include one kind of modified conjugated diene polymer, or it may include two or more kinds of modified conjugated diene polymers. In addition to the modified conjugated diene polymer(s), the modified conjugated diene rubber may include other rubber ingredients. Examples of other rubber ingredients include natural rubber, synthetic isoprene rubber, butadiene rubber, modified butadiene rubber, styrene-butadiene rubber, modified styrene-butadiene rubber, ethylene-α-olefin copolymer rubber, styrene-α-olefin-diene copolymer rubber, acrylonitrile-butadiene copolymer rubber, chloroprene rubber, halogenated butyl rubber, styrene-isoprene copolymer rubber, butadiene-isoprene copolymer rubber, random styrene-butadiene-isoprene copolymer rubber, styrene-acrylonitrile-butadiene copolymer rubber, acrylonitrile-butadiene copolymer rubber and polystyrene-polybutadiene-polystyrene block copolymer, and mixtures thereof recited above etc. Even when other rubber ingredients publicly known to be usable in rubber compositions for tire use are incorporated, it is possible to manufacture cross-linked rubber superior in low hysteresis-loss property.

[3-2] Other Ingredients (Carbon Black, Silica):

It is preferable that the rubber composition of the exemplary embodiment further include carbon black and/or silica.

Examples of carbon black include furnace black, typified by SRF, GPF, FEF, HAF, ISAF, SAF, ISAF-HS, ISAF-LS, IISAF-HS, HAF-HS and HAF-LS, acetylene black, thermal black, channel black and graphite, and further include graphite fiber and fullerene etc. Additionally, it is preferable for the carbon black to have iodine adsorption (IA) of 60 mg/g or more and dibutyl phthalate oil absorption (DBP) of 80 ml/100 g or more. The use of carbon black increases effects on improvements in grip performance and fracture resistance characteristics of cross-linked rubber compositions. Of the carbon black products, HAF, ISAF and SAF which are excellent in abrasion resistance in particular are preferable. Those varieties of carbon black may be used alone, or any two or more of them may be used in combination.

Examples of silica include wet silica (hydrated silicic acid), dry silica (silicic acid anhydride), colloidal silica, precipitated silica, calcium silicate and aluminum silicate. Of these types of silica, wet silica of which effects is outstanding on improvements in fracture resistance characteristics and compatibility between wet skid resistance and a low hysteresis-loss property is preferable. Additionally, it is also preferable to use silica of high dispersible type from the viewpoints of excellent ability to disperse into rubber, physical properties and workability. Those types of silica may be used alone, or any two or more of them may be used in combination.

The rubber composition of the exemplary embodiment is a rubber composition which includes carbon black and/or silica, preferably in an amount of 20 to 130 parts by mass and more preferably in an amount of 25 to 110 parts by mass from the viewpoint of reinforcement and its accompanying effect on improvements in various physical properties, with respect to 100 parts by mass of rubber ingredients (the sum of modified conjugated diene polymer(s) and other rubber ingredients).

Additionally, when the percentage of carbon black and/or silica content is low, there is a tendency toward insufficiency of effect on improvements in fracture resistance characteristics and so on; while, when the percentage of carbon black and/or silica content is high, there is a tendency toward reduction in workability of rubber compositions. Therefore, it is preferable that the percentage of such content be within the range specified above.

Additionally, by mixing a carbon-silica dual phase filler into the present copolymer rubber, an excellent advantage similar to using carbon black and silica in combination can be obtained. The carbon-silica dual phase filler is a carbon black to the surface of which silica is chemically bound, which is the so-called silica coating carbon black. Examples thereof include products of Cabot Corporation markets under the trade names of CRX2000, CRX2002 and CRX2006. The amount of carbon-silica dual phase filler mixed is preferably from 1 to 100 parts by mass, more preferably from 5 to 95 parts by mass, with respect to 100 parts by mass of the total for rubber ingredients.

In the case of incorporating silica as a reinforcing agent into the rubber composition of the exemplary embodiment, mixing a silane coupling agent is preferable for further improvement in reinforcing effect of silica. Examples of such a silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N, N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, vinyltriethoxysilane, β-(3,4-epoxycyclohexypethyltrimethoxysilane, N-(β-aminoethyl)-β-aminopropyltrimethoxysilane, 3-octathio-1-propyl-triethoxysilane, γ-trimethoxysilylpropyldimethylthiocarbamyl tetrasulfide, γ-trimethoxysilylpropylbenzothiazyl tetrasulfide, and the mercaptosilane compounds cited in JP-A-2006-249069. Examples of a commercially available silane coupling agent include products of Momentive Performance Materials Inc. marketed under the trade names NXT Silane, NXT-Low-V Silane and NXT Ultra Low-V Silane, a product of Degussa AG marketed under the trade name VP Si363, and a product of Gelest, Inc. marketed under the trade name 11-MERCAPTOUNDECYLTRIMETHOXYSILANE etc. Of these silane coupling agents, bis(3-triethoxysilylpropyl) polysulfide, 3-trimethoxysilylpropylbenzothiazyl tetrasulfide and the mercaptosilane compounds cited in JP-A-2006-249069 are favorable in point of their effects on improvement in reinforcing capability and the like. Additionally, these coupling agents can be used alone, or any two or more of them can be used in combination. Although it differs depending on the type and so on, the suitable amount of a silane coupling agent mixed is from preferably 1 to 20 parts by mass and more preferably from 3 to 15 parts by mass, with respect to 100 parts by mass of silica. When the mixing amount is less than one part by mass, there is a tendency of the silane coupling agent to face difficulty in sufficiently exerting its effect. On the other hand, when the mixing amount is more than 20 parts by mass, there is a tendency of the silane coupling agent to easily cause gelation of rubber ingredients.

The present rubber composition has no particular limitation as to various compounding agents, and it is also possible to add a compatibilizer at the time of kneading for the purpose of improving the workability under kneading or further enhancing a balance between wet skid resistance, a low hysteresis-loss property, abrasion resistance and so on. Compatibilizers which are suitable for use include organic compounds chosen from among epoxy group-containing compounds, carboxylic acid compounds, carboxylic acid ester compounds, ketone compounds, ether compounds, aldehyde compounds, hydroxyl group-containing compounds or amino group-containing compounds, and silicon compounds chosen from alkoxysilane compounds, siloxane compounds or aminosilane compounds.

Examples of the organic compounds as compatibilizers include the following compounds.

Epoxy group-containing compounds: butyl glycidyl ether, diglycidyl ether, propylene oxide, neopentyl glycol diglycidyl ether, epoxy resin, epoxidated soybean oil, epoxidated fatty esters and the like.

Carboxylic acid compounds: adipic acid, octylic acid, methacrylic acid and the like.

Carboxylic acid ester compounds: acrylic acid esters, diethylene acrylate, ethyl methacrylate, orthoacetic acid esters, ethyl acetoacetate, butyl acetate, isopropyl acetate, dimethyl carbonate, p-hydroxyphenyl acetate, polyester-type plasticizers, stearic acid-type plasticizers and the like.

Ketone compounds: methylcyclohexanone, acetyl acetone and the like.

Ether compounds: isopropyl ether, dibutyl ether and the like.

Aldehyde compounds: undecylene aldehyde, decyl aldehyde, vanillin, 3,4-dimethoxybenzaldehyde, cuminaldehyde and the like.

Amino group-containing compounds: isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, n-butylamine hydrochloride and the like.

Hydroxyl group-containing compounds: isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, triethylene glycol and the like.

Of these compounds, epoxy group-containing compounds, amino group-containing compounds and hydroxyl group-containing compounds are preferable.

Examples of a silicon compound as a compatibilizer include the following compounds.

Alkoxysilane compounds: trimethylmethoxysilane, trimethylethoxysilane, dimethyldimethoxysilane, methyltriethoxysilane, methyltriphenoxysilane, tetraethoxysilane, methyldiethoxysilane, vinyltrimethoxysilane and the like.

Siloxane compounds: dimethylsiloxane oligomer, silicone oil, amino-modified silicone oil, epoxy-modified silicone oil, carboxyl-modified silicone oil, polyether-modified silicone oil, alkyl-modified silicone oil, higher fatty ester-modified silicone oil, higher alcohol-modified silicone oil, higher fatty acid-containing silicone oil and the like.

Aminosilane compounds: hexamethyldisilazane, nonamethyltrisilazane, anilinotrimethylsilane, bis(dimethylamino)dimethylsilane, bis(diethylamino)dimethylsilane, triethylaminosilane and the like.

Of these compounds, the silazane compounds and bis(dimethylamino)dimethylsilane are preferable.

To the rubber composition of the exemplary embodiment, various kinds of chemicals and additives which are commonly used in rubber industry can be added, if desired, to the extent that the aims of the present invention are not impaired. Examples of chemicals and additives which can be added to the rubber composition of the exemplary embodiment include a cross-linking agent (e.g. vulcanizing agent), a vulcanizing assistant, a working assistant, a vulcanization accelerator, process oil, an anti-aging agent, an anti-scorching agent, zinc oxide and stearic acid.

Examples of a cross-linking agent include sulfur, sulfur halides, organic peroxides, quinone dioximes, organic polyvalent amine compounds, and alkylphenol resins containing methylol group. However, sulfur is in common use, and its usage is preferably from 0.1 to 5 parts by mass and more preferably from 0.5 to 3 parts by mass, with respect to 100 parts by mass of total rubber ingredients.

As the vulcanizing assistant and the working assistant, stearic acid is generally used. The amount of these assistants used is usually from 0.5 to 5 parts by mass with respect to 100 parts by mass of total rubber ingredients. As to the vulcanization accelerator, there is no particular limitation, and examples thereof may be compounds of sulfenamide type, guanidine type, thiuram type, thiourea type, thiazole type, dithiocarbamic acid type or xanthogenic type. Suitable examples of the compounds include 2-mercaptobenzothiazole, dibenzothiazyl disulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenylguanidine, diorthotolylguanidine and orthotolylbiguanidine. The amount of vulcanization accelerator used is generally from 0.1 to 5 parts by mass, preferably from 0.4 to 4 parts by weight, with respect to 100 parts by mass of total rubber ingredients.

The present rubber composition can be manufactured through kneading with a kneader, such as an open kneader, notably a roll-type open kneader, or a closed kneader, notably a Banbury mixer. In addition, the present rubber composition can be applied to various rubber products by undergoing cross-linking (vulcanization) subsequent to molding. The cross-linked rubber composition (rubber composition after cross-linking) according to the exemplary embodiment is suitable for uses of tires, such as tire tread, under tread, a carcass, a side wall and a bead component, uses as industrial products, such as a rubber cushion, a fender, a belt and a hose, and so on. Among these uses, the cross-linked rubber composition according to the exemplary embodiment is suitably used as a rubber for tire tread in particular.

Physical properties and others of each of the substances in the present invention, namely the modified conjugated diene polymer (obtained in the process step (a)), the modified conjugated diene rubber (obtained in the process step (b)), the rubber composition and the cross-linked rubber composition, are as follows.

As to the conjugated diene polymer before undergoing modification, from the viewpoint of ensuring a balance between shape stability of the modified conjugated diene rubber and workability in producing the rubber composition, its weight-average molecular weight is preferably from 10,000 to 1,500,000, more preferably from 50,000 to 1,000,000, especially preferably from 100,000 to 800,000, as measured by gel permeation chromatography (GPC) and calculated in terms of polystyrene.

As to the modified conjugated diene rubber, its glass transition temperature is preferably 0° C. or less, more preferably −5° C. or less and especially preferably −10° C. or less, from the viewpoint of ensuring a balance between a low hysteresis-loss property and wet skid resistance of the cross-linked rubber composition to be obtained.

The Mooney viscosity (ML1+4, 100° C.) of the modified conjugated diene rubber is preferably from 30 to 150 and more preferably from 40 to 120, from the viewpoint of ensuring a balance between shape stability of the modified conjugated diene rubber and workability in producing the rubber composition.

The cold flow value (mg/min) of the modified conjugated diene rubber is preferable 1.5 or less, more preferably 1.0 or less and especially preferably 0.5 or less, from the viewpoint of shape stability of the modified conjugated diene rubber.

The temporal stability (ΔML1+4, 100° C.) of the modified conjugated diene rubber is preferably 8 or below, more preferably 6 or below and especially preferably 4 or below, from the viewpoint of storage stability of the modified conjugated diene rubber.

The Mooney viscosity (ML1+4, 100° C.) of the rubber composition is preferably from 20 to 150; more preferably from 30 to 130; and especially preferably from 40 to 110, from the viewpoint of workability in making tires.

The index of tensile strength (JIS K 6301, 300% modulus) of the cross-linked rubber is preferably 100 or above and more preferably 103 or above.

The index of tan δ which the cross-linked rubber has at 0° C. is preferably 106 or more and more preferably 108 or more. As for this index, the greater the value thereof, the greater the cross-linked rubber is in wet skid resistance, and the more satisfactory the cross-linked rubber.

The index of tan δ which the cross-linked rubber has at 70° C. is preferably 105 or more and more preferably 106 or more. As for this index, the greater the value thereof, the smaller the cross-linked rubber is in hysteresis loss, and the better it is in low hysteresis-loss property.

The index of abrasion resistance (JIS K 6264, load 10N, 25° C.) of the cross-linked rubber is preferably 95 or more, more preferably 97 or more and especially preferably 99 or more.

EXAMPLES

Although the present invention is explained below specifically by reference to the following examples, the present invention should not be construed as being limited to these examples. Additionally, all parts and percentages in the following examples and comparative examples are by mass unless otherwise indicated. Furthermore, methods of measuring the values of various physical properties are shown below.

[Bonded styrene content (%)]: The value thereof was determined by 500 MHz $^1$H-NMR.

[Vinyl content (%)]: The value thereof was determined by 500 MHz $^1$H-NMR.

[Glass transition temperature (° C.)]: The value thereof was measured in conformity with ASTM D3418.

[Average molecular weight of polymer before modification]: The value thereof was determined from a retention time corresponding to the top of a maximum peak on a GPC curve obtained using gel permeation chromatography (GPC) (HLC-8120GPC, trade name, a product of Tosoh Corporation) and calculated in terms of polystyrene.

(Conditions of GPC)
　Column: Two columns, each of which is GMHHXL (trade name, a product of Tosoh Corporation)
　Column temperature: 40° C.
　Mobile phase: Tetrahydrofuran
　Flow velocity: 1.0 ml/min
　Sample concentration: 10 mg/20 ml

[Mooney viscosity (ML1+4, 100° C.)]: The value thereof was determined in conformity with JIS K6300 and by using an L-rotor under conditions that preheating is carried out for 1 minute and the rotor is operated for 4 minutes at a temperature 100° C.

[Cold flow value (mg/min)]: A copolymer was kept at 50° C. and extruded from a 6.35 mm orifice under a pressure of 24.1 kPa. After a lapse of 10 minutes from the time of extrusion (after the extrusion speed becomes uniform), the amount (mg) of the copolymer extruded was measured every 30 minutes during 90 minutes, and the average of the measured amounts was defined as a cold flow value. The greater the value, the poorer shape stability the rubber has and the harder its handling becomes.

[Temporal stability (ΔML1+4, 100° C.)]: A copolymer was kept for 2 days under a temperature of 85° C. and a humidity of 90%, and then its Mooney viscosity (ML1+4, 100° C.) was measured in conformity with JIS K6300 and by using an L-rotor under conditions that preheating was carried out for 1 minute and the rotor was operated for 4 minutes at a temperature of 100° C. to determine the temporal stability from a difference from the Mooney viscosity (ML1+4, 100° C.) measured just after production. The greater a difference between the values, the poorer storage stability the rubber has and the harder its handling becomes.

Example 1

Synthesis of Modified Conjugated Diene Rubber A, and Evaluation Thereof

Into autoclave reactor having an interior volume of 5 liter which was displaced by nitrogen, 2,750 g of cyclohexane, 50.0 g of tetrahydrofuran, 125 g of styrene and 365 g of 1,3-butadiene were charged. The contents in the reactor were adjusted to have a temperature of 10° C., and then polymerization was initiated by addition of a cyclohexane solution containing n-butyl lithium (5.80 mmol). The polymerization was carried out under adiabatic conditions, and the maximum temperature reached to 85° C.

When the conversion rate in the polymerization reached to 99%, 10 g of 1,3-butadiene was further added, and polymerization was further performed for 5 minutes. Thereafter, a 10 g of polymer solution was sampled for measurement of molecular weight before modification, and a cyclohexane solution containing N-[3-(trimethoxysilyl)-propyl]-N,N'-diethyl-N'-trimethylsilyl-ethane-1,2-diamine (4.96 mmol) was added to perform reaction for 15 minutes. To the polymer solution having after the reaction, a cyclohexane solution containing silicon tetrachloride (3.93 mmol) was added, and mixing of these solutions was carried out for 5 minutes. Then 2.0 g of 2,6-di-tert-butyl-p-cresol was added to the obtained polymer solution. Subsequently thereto, the solvent was removed by performing steam stripping through the use of hot water adjusted to pH=9 with sodium hydroxide, and a rubber was dried by means of hot rolls adjusted to a temperature of 110° C. Thus, modified conjugated diene rubber A was obtained.

The polymerization formula of the modified conjugated diene rubber A is shown in Table 1, and properties of the modified conjugated diene rubber A thus obtained are shown in Table 2. Further, a rubber composition prepared by using the modified conjugated diene rubber A and according to a compounding formula shown in Table 3 was vulcanized, and physical properties of the vulcanized rubber composition were evaluated. Results thereof are shown in Table 4.

Example 2

Synthesis of Modified Conjugated Diene Rubber B, and Evaluation Thereof

Modified conjugated diene rubber B was obtained in the same manner as in Example 1, except that N-[3-(trimethoxysilyl)-propyl]-N,N'-diethyl-N'-trimethylsilylethane-1,2-diamine used in Example 1 was changed to 3-(4-trimethylsilyl-1-piperazino)propyltriethoxysilane.

The polymerization formula of the modified conjugated diene rubber B is shown in Table 1, and properties of the modified conjugated diene rubber B thus obtained are shown in Table 2. Further, a rubber composition prepared by using the modified conjugated diene rubber B and according to a compounding formula shown in Table 3 was vulcanized, and physical properties of the vulcanized rubber composition were evaluated. Results thereof are shown in Table 4.

Example 3

Synthesis of Modified Conjugated Diene Rubber C, and Evaluation Thereof

Modified conjugated diene rubber C was obtained in the same manner as in Example 1, except that N-[3-(trimethoxysilyl)-propyl]-N,N'-diethyl-N'-trimethylsilylethane-1,2-diamine used in Example 1 was changed to 3-(4-methyl-1-piperazino)propyltriethoxysilane.

The polymerization formula of the modified conjugated diene rubber C is shown in Table 1, and properties of the modified conjugated diene rubber C thus obtained are shown in Table 2. Further, a rubber composition prepared by using the modified conjugated diene rubber C and according to a compounding formula shown in Table 3 was vulcanized, and physical properties of the vulcanized rubber composition were evaluated. Results are shown in Table 4.

Example 4

Synthesis of Modified Conjugated Diene Rubber D, and Evaluation Thereof

Modified conjugated diene rubber D was obtained in the same manner as in Example 1, except that N-[3-(trimethoxysilyl)-propyl]-N,N'-diethyl-N'-trimethylsilylethane-1,2-diamine used in Example 1 was changed to 3-diethylaminopropyltriethoxysilane and the amount of silicon tetrachloride added was changed to 2.69 mmol from 3.93 mmol in Example 1.

The polymerization formula of the modified conjugated diene rubber D is shown in Table 1, and properties of the modified conjugated diene rubber D thus obtained are shown in Table 2. Further, a rubber composition prepared by using the modified conjugated diene rubber D and according to a compounding formula shown in Table 3 was vulcanized, and physical properties of the vulcanized rubber composition were evaluated. Results thereof are shown in Table 4.

Example 5

Synthesis of Modified Conjugated Diene Rubber E, and Evaluation Thereof

Into an autoclave reactor having an interior volume of 5 liter which was displaced with nitrogen, 2,750 g of cyclohexane, 10.3 g of tetrahydrofuran, 50 g of styrene and 440 g of 1,3-butadiene were charged. The contents in the reactor were adjusted to have a temperature of 10° C., and then polymerization was initiated by addition of a cyclohexane solution containing n-butyl lithium (5.80 mmol). The polymerization was carried out under adiabatic conditions, and the maximum temperature reached to 90° C.

When the conversion rate in the polymerization reached to 99%, 10 g of 1,3-butadiene was further added, and polymerization was further performed for 5 minutes. Thereafter, a 10 g of polymer solution was sampled for measurement of molecular weight before modification, and a cyclohexane solution containing S-trimethylsilylmercaptopropyltriethoxysilane (4.96 mmol) was added, to perform reaction for 15 minutes. To the polymer solution after reaction, a cyclohexane solution containing silicon tetrachloride (2.69 mmol) was added, and mixing of these solutions was carried out for 5 minutes. Then to the polymer solution obtained, 2.0 g of 2,6-di-tert-butyl-p-cresol was added. Subsequently thereto, the solvent was removed by performing steam stripping through the use of hot water adjusted to pH=5 with sulfuric acid, and rubber obtained was dried by means of hot rolls adjusted to a temperature of 110° C. Thus, modified conjugated diene rubber E was obtained.

The polymerization formula of the modified conjugated diene rubber E is shown in Table 1, and properties of the modified conjugated diene rubber E thus obtained are shown in Table 2. Further, a rubber composition prepared by using the modified conjugated diene rubber E and according to a compounding formula shown in Table 3 was vulcanized, and physical properties of the vulcanized rubber composition were evaluated. Results thereof are shown in Table 4.

Example 6

Synthesis of Modified Conjugated Diene Rubber F, and Evaluation Thereof

Modified conjugated diene rubber F was obtained in the same manner as in Example 1, except that N-[3-(trimethoxysilyl)-propyl]-N,N'-diethyl-N'-trimethylsilylethane-1,2-diamine used in Example 1 was changed to 3-diphenylphosphinopropyltrimethoxysilane and the amount of silicon tetrachloride added was changed to 2.69 mmol from 3.93 mmol in Example 1.

The polymerization formula of the modified conjugated diene rubber F is shown in Table 1, and properties of the modified conjugated diene rubber F thus obtained are shown in Table 2. Further, a rubber composition prepared by using the modified conjugated diene rubber F and according to a compounding formula shown in Table 3 was vulcanized, and physical properties of the vulcanized rubber composition were evaluated. Results thereof are shown in Table 4.

Example 7

Synthesis of Modified Conjugated Diene Rubber G, and Evaluation Thereof

Into an autoclave reactor having an interior volume of 5 liter which was displaced by nitrogen, 2,750 g of cyclohexane, a cyclohexane solution containing 3.25 mmol of 2,2-di(tetrahydrofuryl)propane, 125 g of styrene, 365 g of 1,3-butadiene and piperidine (4.70 mmol) was charged. The contents in the reactor were adjusted to have a temperature of 10° C., and then polymerization was initiated by addition of a cyclohexane solution containing n-butyl lithium (5.80 mmol). The polymerization was carried out under adiabatic conditions, and the maximum temperature reached to 85° C.

When the conversion rate in the polymerization reached to 99%, 10 g of 1,3-butadiene was further added, and thereby polymerization was further performed for 5 minutes. Thereafter, a 10 g of polymer solution was sampled for measurement of molecular weight before modification, and a cyclohexane solution containing 3-(4-trimethylsilyl-1-piperazino)propyltriethoxysilane (4.96 mmol) was added to perform reaction for 15 minutes. To the polymer solution after the reaction, a cyclohexane solution containing silicon tetrachloride (5.11 mmol) was added, and mixing of these solutions was carried out for 5 minutes. Then to the polymer solution obtained, 4.0 g of 2,6-di-tert-butyl-p-cresol was added. Subsequently thereto, the solvent was removed by performing steam stripping through the use of hot water adjusted to pH=10 with sodium hydroxide, and rubber obtained was dried by means of hot rolls adjusted to a temperature of 110° C. Thus, modified conjugated diene rubber G was obtained.

The polymerization formula of the modified conjugated diene rubber G is shown in Table 1, and properties of the modified conjugated diene rubber G obtained are shown in Table 2. Further, a rubber composition prepared by using the modified conjugated diene rubber G and according to a compounding formula shown in Table 3 was vulcanized, and physical properties of the vulcanized rubber composition were evaluated. Results thereof are shown in Table 4.

Example 8

Synthesis of Modified Conjugated Diene Rubber H, and Evaluation Thereof

Modified conjugated diene rubber H was obtained in the same manner as in Example 7, except that silicon tetrachloride (5.11 mmol) used in Example 7 was changed to diethylaluminum chloride (20.4 mmol).

The polymerization formula of the modified conjugated diene rubber H is shown in Table 1, and properties of the modified conjugated diene rubber H obtained are shown in Table 2. Further, a rubber composition prepared by using the modified conjugated diene rubber H and according to a compounding formula shown in Table 3 was vulcanized, and physical properties of the vulcanized rubber composition were evaluated. Results thereof are shown in Table 4.

Example 9

Synthesis of Modified Conjugated Diene Rubber I, and Evaluation Thereof

Modified conjugated diene rubber I was obtained in the same manner as in Example 7, except that silicon tetrachloride (5.11 mmol) used in Example 7 was changed to titanium tetrachloride (5.10 mmol).

The polymerization formula of the modified conjugated diene rubber I is shown in Table 1, and properties of the modified conjugated diene rubber I obtained are shown in Table 2. Further, a rubber composition prepared by using the modified conjugated diene rubber I and according to a compounding formula shown in Table 3 was vulcanized, and physical properties of the vulcanized rubber composition were evaluated. Results thereof are shown in Table 4.

Example 10

Synthesis of Modified Conjugated Diene Rubber J, and Evaluation Thereof

Modified conjugated diene rubber J was obtained in the same manner as in Example 7, except that silicon tetrachloride (5.11 mmol) used in Example 7 was changed to isopropyl acid phosphate (13.61 mmol).

The polymerization formula of the modified conjugated diene rubber J is shown in Table 1, and properties of the modified conjugated diene rubber J obtained are shown in Table 2. Further, a rubber composition prepared by using the modified conjugated diene rubber J and according to a compounding formula shown in Table 3 was vulcanized, and physical properties of the vulcanized rubber composition were evaluated. Results thereof are shown in Table 4.

Example 11

Synthesis of Modified Conjugated Diene Rubber K, and Evaluation Thereof

Into an autoclave reactor having an interior volume of 5 liter which was displaces by nitrogen, 2,750 g of cyclohexane, 100.0 g of tetrahydrofuran, 180 g of styrene and 310 g of 1,3-butadiene were charged. The contents in the reactor were adjusted to have a temperature of 20° C., and then polymerization was initiated by addition of a cyclohexane solution containing n-butyl lithium (4.60 mmol). The polymerization was carried out under adiabatic conditions, and the maximum temperature reached to 85° C.

When the conversion rate in the polymerization reached to 99%, 10 g of 1,3-butadiene was further added, and polymerization was further performed for 5 minutes. Thereafter, a 10 g of polymer solution was sampled for measurement of molecular weight before modification, and a cyclohexane solution containing 3-(4-trimethylsilyl-1-piperazino) propyltriethoxysilane (3.93 mmol) was added, to perform reaction for 15 minutes. To the polymer solution after the reaction, a cyclohexane solution containing silicon tetrachloride (3.12 mmol) was added, and mixing of the solutions was carried out for 5 minutes. Then, to the polymer solution obtained, 2.0 g of 2,6-di-tert-butyl-p-cresol, and subsequently 187.5 g of naphthene-based oil (SNH46, trade name, a product of SANKYO YUKA KOGYO K.K.), was added to be mixed together for 5 minutes. Next, the solvent was removed from the resulting solution by performing steam stripping through the use of hot water adjusted to pH=9 with sodium hydroxide, and rubber obtained was dried by means of hot rolls adjusted to a temperature of 110° C. Thus, modified conjugated diene rubber K was obtained.

The polymerization formula of the modified conjugated diene rubber K is shown in Table 1, and properties of the modified conjugated diene rubber K thus obtained are shown in Table 2. Further, a rubber composition prepared by using the modified conjugated diene rubber K and according to a compounding formula shown in Table 3 was vulcanized, and physical properties of the vulcanized rubber composition were evaluated. Results thereof are shown in Table 4.

Comparative Example 1

Synthesis of Modified Conjugated Diene Rubber L, and Evaluation Thereof

Modified conjugated diene rubber L was obtained in the same manner as in Example 1, except that N-[3-(trimethoxysilyl)-propyl]-N,N'-diethyl-N'-trimethylsilylethane-1,2-diamine used in Example 1 was changed to N,N-bis(triethylsilyl)aminopropylmethyldimethoxysilane.

The polymerization formula of the modified conjugated diene rubber L is shown in Table 1, and properties of the modified conjugated diene rubber L thus obtained are shown in Table 2. Further, a rubber composition prepared by using the modified conjugated diene rubber L and according to a compounding formula shown in Table 3 was vulcanized, and physical properties of the vulcanized rubber composition were evaluated. Results are shown in Table 4.

Comparative Example 2

Synthesis of Modified Conjugated Diene Rubber M, and Evaluation Thereof

Modified conjugated diene rubber M was obtained in the same manner as in Example 2, except that silicon tetrachloride used in Example 2 was not added.

The polymerization formula of the modified conjugated diene rubber M is shown in Table 1, and properties of the modified conjugated diene rubber M thus obtained are shown in Table 2. Further, a rubber composition prepared by using the modified conjugated diene rubber M and according to a compounding formula shown in Table 3 was vulcanized, and physical properties of the vulcanized rubber composition were evaluated. Results are shown in Table 4.

Comparative Example 3

Synthesis of Modified Conjugated Diene Rubber N, and Evaluation Thereof

Modified conjugated diene rubber N was obtained in the same manner as in Example 1, except that N-[3-(trimethoxysilyl)-propyl]-N,N'-diethyl-N'-trimethylsilylethane-1,2-diamine used in Example 1 was changed to tetraethoxysilane.

The polymerization formula of the modified conjugated diene rubber N is shown in Table 1, and properties of the modified conjugated diene rubber N thus obtained are shown in Table 2. Further, a rubber composition prepared by using the modified conjugated diene rubber N and according to a compounding formula shown in Table 3 was vulcanized, and physical properties of the vulcanized rubber composition were evaluated. Results are shown in Table 4.

Comparative Example 4

Synthesis of Modified Conjugated Diene Rubber O, and Evaluation Thereof

Modified conjugated diene rubber O was obtained in the same manner as in Comparative Example 3, except that silicon tetrachloride (3.93 mmol) used in Comparative Example 3 was changed to stannous 2-ethylhexylate (2.69 mmol).

The polymerization formula of the modified conjugated diene rubber O is shown in Table 1, and properties of the modified conjugated diene rubber O obtained are shown in Table 2. Further, a rubber composition prepared by using the modified conjugated diene rubber O and according to a compounding formula shown in Table 3 was vulcanized, and physical properties of the vulcanized rubber composition were evaluated. Results are shown in Table 4.

Comparative Example 5

Synthesis of Modified Conjugated Diene Rubber P, and Evaluation Thereof

Modified conjugated diene rubber P was obtained in the same manner as in Example 11, except that 3-(4-trimethylsilyl-1-piperazino)propyltriethoxysilane used in Example 11 was not added and the amount of silicon tetrachloride added was changed from 3.12 mmol to 0.83 mmol.

The polymerization formula of the modified conjugated diene rubber P is shown in Table 1, and properties of the modified conjugated diene rubber P obtained are shown in Table 2. Further, a rubber composition prepared by using the modified conjugated diene rubber P and according to a compounding formula shown in Table 3 was vulcanized, and physical properties of the vulcanized rubber composition were evaluated. Results are shown in Table 4.

Comparative Example 6

Synthesis of Conjugated Diene Rubber Q, and Evaluation Thereof

Into an autoclave reactor having an interior volume of 5 liter which was displaced by nitrogen, 2,750 g of cyclohexane, 50.0 g of tetrahydrofuran, 125 g of styrene and 365 g of 1,3-butadiene were charged. The contents in the reactor were adjusted to have a temperature of 10° C., and then polymerization was initiated by addition of a cyclohexane solution containing n-butyl lithium (5.80 mmol). The polymerization was carried out under adiabatic conditions, and the maximum temperature reached to 85° C.

When the conversion rate in the polymerization reached to 99%, 10 g of 1,3-butadiene was further added, and polymerization was further performed for 5 minutes. Thereto, a cyclohexane solution containing silicon tetrachloride (1.04 mmol) was added to carry out reaction for 15 minutes. Then to the polymer solution obtained, 2.0 g of 2,6-di-tert-butyl-p-cresol was added. Next, the solvent was removed by performing steam stripping through the use of hot water adjusted to pH=9 with sodium hydroxide, and rubber obtained was dried by means of hot rolls adjusted to a temperature of 110° C. Thus, conjugated diene rubber Q was obtained.

The polymerization formula of the conjugated diene rubber Q is shown in Table 1, and properties of the conjugated diene rubber Q obtained are shown in Table 2. Further, a rubber composition prepared by using the conjugated diene rubber Q and according to a compounding formula shown in Table 3 was vulcanized, and physical properties of the vulcanized rubber composition were evaluated. Results thereof are shown in Table 4.

[Method of Kneading Rubber Composition, and Characteristic Evaluation]

As first-step kneading, the modified conjugated diene rubber obtained in each of Examples and Comparative Examples, butadiene rubber, natural rubber, extension oil, carbon black, silica, a silane coupling agent, stearic acid, an anti-aging agent and zinc oxide were kneaded by using a plastomill (an interior volume: 250 cc) attached to a temperature controlling device according to a compounding formula shown in shown in Table 3 and under conditions that the filling rate is 72% and the number of revolutions is 60 rpm. And then, as second-step kneading, the compounded matter obtained was cooled to room temperature, and kneaded with sulfur and a vulcanization accelerator. The kneaded matter obtained was subjected to molding, and vulcanized at 160° C. for a given time by means of a vulcanizing press. On the vulcanized rubber composition thus obtained, characteristic evaluations describing the following tire performance were performed.

(i) Mooney viscosity: Each of the rubber compositions before vulcanization was chosen as a measurement sample, and the measurement was carried out by using an L-rotor in conformity with JIS K6300 under conditions that the time of preheating was 1 minutes, the running time of the rotor was 4 minutes and the temperature was 100° C.

(ii) Tensile strength: In conformity with JIS K6301, a 300% modulus was measured. The measurement value was expressed as an index, wherein Comparative Example 6 is taken as 100. The greater the index value, the greater and the more satisfactory the tensile strength.

(iii) Workability: After the first-step kneading, 6-inch rolls were set at a temperature of 50° C., a speed ratio of 20 rpm/20 rpm and a thickness of 2 mm, and a compound sheet was formed by passing each compounded matter between the rolls for three times. The thus formed compound sheets were assessed by visual observations, and marked as follows.

Mark of 3: A compound sheet has no asperities on its surface texture, and it has sharp edges also.

Mark of 2: A compound sheet is between the mark of 3 and the mark of 1.

Mark of 1: A compound sheet has asperities on its surface texture, and it has serrated edges also.

(iv) 0° C. tan δ: Vulcanized rubber was used as a measurement sample, 0° C. tan δ thereof was determined by using a dynamic spectrometer (made by US Rheometric Inc.) under conditions that the tensile dynamic distortion was 0.14%, the angular velocity was 100 radians per second and the temperature was 0° C. It was expressed as an index wherein Comparative Example 6 is taken as 100, and the greater the value thereof, the greater and the more satisfactory the wet skid resistance.

(v) 70° C. tan δ: Vulcanized rubber was used as a measurement sample, 70° C. tan δ thereof was determined by using a dynamic spectrometer (made by US Rheometric Inc.) under conditions that the tensile dynamic distortion was 0.7%, the angular velocity was 100 radians per second and the temperature was 70° C. It was expressed as an index wherein Comparative Example 6 is taken as 100, and the greater the value thereof, the smaller and the more satisfactory the low hysteresis-loss property.

(vi) Abrasion resistance: Vulcanized rubber was used as a measurement sample, and abrasion resistance thereof was determined by using a DIN abrasion tester (made by Toyo Seiki Seisaku-Sho, Ltd.) under a load of 10N at 25° C. in conformity with JIS K 6264. The abrasion resistance was expressed as an index, wherein Comparative Example 6 is taken as 100. The greater the index value, the better the abrasion resistance.

As is clear from Table 2, it has been shown that the modified conjugated diene rubber M obtained without using any onium-forming agent in Comparative Example 2 was exceedingly great in cold flow value, and it had a problem with a shape-retaining property of rubber. Further, it has been shown that the modified conjugated diene-drived rubber L and N obtained in Comparative Examples 1 and 3, respectively, by using the hydrocarbyloxysilane compounds other than those specified by the present invention were exceedingly poor in temporal stability, and they had a problem with storage stability of rubber.

Additionally, the hydrocarbyloxysilane compound used in Comparative Example 1 is a compound having a nitrogen-containing group formed by substituting two protective groups for two hydrogen atoms of a primary amine and a hydrocarbyloxysilyl group.

On the other hand, as is clear from Table 4, it has been found that the present compositions including the present modified conjugated diene rubber was significantly improved in a balance between workability, wet skid resistance and a low hysteresis-loss property without impairment of tensile strength and abrasion resistance.

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| Kinds of modified conjugated diene rubber | | | A | B | C | D | E | F | G | H | I |
| Polymerization Formula | | | | | | | | | | | |
| Solvent | | | | | | | | | | | |
| :cyclohexane | (g) | | 2750 | 2750 | 2750 | 2750 | 2750 | 2750 | 2750 | 2750 | 2750 |
| Vinyl content-adjusting agent | | | | | | | | | | | |
| :tetrahydrofuran | (g) | | 50.0 | 50.0 | 50.0 | 50.0 | 10.3 | 50.0 | — | — | — |
| :2,2-di(tetrahydrofuryl)propane | (mmol) | | — | — | — | — | — | — | 3.25 | 3.25 | 3.35 |
| Polymerizing monomer | | | | | | | | | | | |
| :styrene | (g) | | 125 | 125 | 125 | 125 | 50 | 125 | 125 | 125 | 125 |
| :butadiene | (g) | | 365 | 365 | 365 | 365 | 440 | 365 | 365 | 365 | 365 |
| :extra added butadiene | (g) | | 10 | 10 | 10 | 10 | 10 | 10 | 10 | 10 | 10 |
| Polymerization initiator | | | | | | | | | | | |
| :piperidine | (mmol) | | — | — | — | — | — | — | 4.70 | 4.70 | 4.70 |
| :n-butyl lithium | (mmol) | | 5.80 | 5.80 | 5.80 | 5.80 | 5.80 | 5.80 | 5.80 | 5.80 | 5.80 |
| Alkoxysilane compound: | | | | | | | | | | | |
| :N—Si-4 *1 | (mmol) | | 4.96 | — | — | — | — | — | — | — | — |
| :N—Si-5 *2 | (mmol) | | — | 4.96 | — | — | — | — | 4.96 | 4.96 | 4.96 |
| :N—Si-8 *3 | (mmol) | | — | — | 4.96 | — | — | — | — | — | — |
| :N—Si-7 *4 | (mmol) | | — | — | — | 4.96 | — | — | — | — | — |
| :S—Si-1 *5 | (mmol) | | — | — | — | — | 4.96 | — | — | — | — |
| :P—Si-1 *6 | (mmol) | | — | — | — | — | — | 4.96 | — | — | — |
| :Si-1 *7 | (mmol) | | — | — | — | — | — | — | — | — | — |
| :N—Si-1 *8 | (mmol) | | — | — | — | — | — | — | — | — | — |
| Onium-forming agent | | | | | | | | | | | |
| :Cl-1 *9 | (mmol) | | 3.93 | 3.93 | 3.93 | 2.69 | 2.69 | 2.69 | 5.11 | — | — |
| :Cl-2 *10 | (mmol) | | — | — | — | — | — | — | — | 20.4 | — |

TABLE 1-continued

| | | | | | | | | | |
|---|---|---|---|---|---|---|---|---|---|
| :Cl-3 *11 | (mmol) | — | — | — | — | — | — | — | 5.10 |
| :P-1 *12 | (mmol) | — | — | — | — | — | — | — | — |
| Condensation catalyst | | | | | | | | | |
| :Sn-1 *13 | (mmol) | — | — | — | — | — | — | — | — |
| Extension oil | | | | | | | | | |
| :Oil *14 | (g) | — | — | — | — | — | — | — | — |

| | | | Example | | Comparative Example | | | | | |
|---|---|---|---|---|---|---|---|---|---|---|
| | | | 10 | 11 | 1 | 2 | 3 | 4 | 5 | 6 |
| Kinds of modified conjugated diene rubber | | | J | K | L | M | N | O | P | Q |
| Polymerization Formula | | | | | | | | | | |
| Solvent | | | | | | | | | | |
| :cyclohexane | | (g) | 2750 | 2750 | 2750 | 2750 | 2750 | 2750 | 2750 | 2750 |
| Vinyl content-adjusting agent | | | | | | | | | | |
| :tetrahydrofuran | | (g) | — | 100.0 | 50.0 | 50.0 | 50.0 | 50.0 | 100.0 | 50.0 |
| :2,2-di(tetrahydrofuryl)propane | | (mmol) | 3.25 | — | — | — | — | — | — | — |
| Polymerizing monomer | | | | | | | | | | |
| :styrene | | (g) | 125 | 180 | 125 | 125 | 125 | 125 | 180 | 125 |
| :butadiene | | (g) | 365 | 310 | 365 | 365 | 365 | 365 | 310 | 365 |
| :extra added butadiene | | (g) | 10 | 10 | 10 | 10 | 10 | 10 | 10 | 10 |
| Polymerization initiator | | | | | | | | | | |
| :piperidine | | (mmol) | 4.70 | — | — | — | — | — | — | — |
| :n-butyl lithium | | (mmol) | 5.80 | 4.60 | 5.80 | 5.80 | 5.80 | 5.80 | 4.60 | 5.80 |
| Alkoxysilane compound: | | | | | | | | | | |
| :N—Si-4 *1 | | (mmol) | — | — | — | — | — | — | — | — |
| :N—Si-5 *2 | | (mmol) | 4.96 | 3.93 | — | 4.96 | — | — | — | — |
| :N—Si-8 *3 | | (mmol) | — | — | — | — | — | — | — | — |
| :N—Si-7 *4 | | (mmol) | — | — | — | — | — | — | — | — |
| :S—Si-1 *5 | | (mmol) | — | — | — | — | — | — | — | — |
| :P—Si-1 *6 | | (mmol) | — | — | — | — | — | — | — | — |
| :Si-1 *7 | | (mmol) | — | — | — | — | 4.96 | 4.96 | — | — |
| :N—Si-1 *8 | | (mmol) | — | — | 4.96 | — | — | — | — | — |
| Onium-forming agent | | | | | | | | | | |
| :Cl-1 *9 | | (mmol) | — | 3.12 | 3.93 | — | 3.93 | — | 0.83 | 1.04 |
| :Cl-2 *10 | | (mmol) | — | — | — | — | — | — | — | — |
| :Cl-3 *11 | | (mmol) | — | — | — | — | — | — | — | — |
| :P-1 *12 | | (mmol) | 13.61 | — | — | — | — | — | — | — |
| Condensation catalyst | | | | | | | | | | |
| :Sn-1 *13 | | (mmol) | — | — | — | — | — | 2.69 | — | — |
| Extension oil | | | | | | | | | | |
| :Oil *14 | | (g) | — | 187.5 | — | — | — | — | 187.5 | — |

*1: N-[3-(Trimethoxysilyl)-propyl]-N,N'-diethyl-N'-trimethylsilyl-ethenae-1,2-diamine
*2: 3-(4-Trimethylsilyl-1-piperazino)propyltriethoxysilane
*3: 3-(4-Methyl-1-piperazino)propyltriethoxysilane
*4: 3-Diethylaminopropyltriethoxysilane
*5: S-Trimethylsilylmercaptopropyltriethoxysilane
*6: 3-Diphenylphosphinopropyltrimethoxysilane
*7: Tetraethoxysilane
*8: N,N-Bis(triethylsilyl)aminopropylmethyldimethoxysilane
*9: Silicon tetrachloride
*10: Diethylaluminum chloride
*11: Titanium tetrachloride
*12: Isopropyl acid phosphate
*13: Stannous 2-ethylhexylate
*14: Naphthene-based oil (with a PCA content lower than 3%)

TABLE 2

|  |  | Example |  |  |  |  |  |  |  |  |  |  | Comparative Example |  |  |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 | 5 | 6 |
| Kinds of modified conjugated diene rubber [Characteristics of modified conjugated diene rubber] |  | A | B | C | D | E | F | G | H | I | J | K | L | M | N | O | P | Q |
| Bounded styrene content | (mass %) | 25 | 25 | 25 | 25 | 10 | 25 | 25 | 25 | 25 | 25 | 36 | 25 | 25 | 25 | 25 | 36 | 25 |
| Vinyl content | (%) | 56 | 55 | 55 | 54 | 43 | 55 | 55 | 54 | 54 | 55 | 62 | 56 | 55 | 55 | 54 | 63 | 56 |
| Glass transition temperature | (° C.) | −31 | −31 | −30 | −31 | −59 | −31 | −31 | −30 | −32 | −31 | −13 | −31 | −31 | −31 | −30 | −13 | −32 |
| Weight-average molecular weight before modification | (ten thousand) | 19 | 19 | 20 | 20 | 20 | 19 | 20 | 21 | 19 | 21 | 28 | 21 | 21 | 21 | 20 | 29 | 21 |
| Mooney viscosity | (ML 1 + 4, 100° C.) | 56 | 55 | 58 | 49 | 63 | 46 | 63 | 53 | 56 | 59 | 48 | 62 | 13 | 41 | 78 | 53 | 53 |
| Cold flow value | (mg/min) | 0.2 | 0.2 | 0.2 | 0.2 | 0.1 | 0.3 | 0.2 | 0.2 | 0.2 | 0.2 | 0.2 | 0.2 | ≥10 | 0.4 | 0.1 | 0.2 | 0.2 |
| Temporal stability | (ΔML 1 + 4, 100° C.) | 3 | 3 | 2 | 4 | 2 | 3 | 2 | 2 | 2 | 3 | 2 | 10 | 3 | 25 | 14 | 0 | 0 |

TABLE 3

| Compounding Formula (phr) | I | II |
|---|---|---|
| Modified conjugated diene rubber | 80 | 110 |
| Butadiene rubber *1) | — | 20 |
| Natural rubber | 20 | — |
| Extension oil *2) | 37.5 | 7.5 |
| Carbon Black *3) | 5.6 | 5.6 |
| Silica *4) | 80 | 80 |
| Silane coupling agent *5) | 6.4 | 6.4 |
| Stearic acid | 2.0 | 2.0 |
| Anti-aging agent *6) | 1.0 | 1.0 |
| Zinc oxide | 3.0 | 3.0 |
| Vulcanization accelerator CZ *7) | 1.8 | 1.8 |
| Vulcanization accelerator D *8) | 1.5 | 1.5 |
| Sulfur | 1.5 | 1.5 |

*1) T700 manufactured by JSR Corporation
*2) SNH46 manufactured by SANKYO YUKA KOGYO K.K.
*3) DIABLACK N339 manufactured by Mitsubishi Chemical Corporation
*4) Nipsil AQ manufactured by Tosoh Silica Corporation
*5) Si69 manufactured by Evonik Industries
*6) NOCRAK 810NA manufactured by Ouchi Shinko Chemical Industrial Co., Ltd.
*7) NOCCELER CZ manufactured by Ouchi Shinko Chemical Industrial Co., Ltd.
*8) NOCCELER D manufactured by Ouchi Shinko Chemical Industrial Co., Ltd.

TABLE 4

|  |  | Example |  |  |  |  |  |  |  |  |  |  | Comparative Example |  |  |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 | 5 | 6 |
| Kinds of modified conjugated diene rubber [Physical properties of cross-linked rubber composition] |  | A | B | C | D | E | F | G | H | I | J | K | L | M | N | O | P | Q |
| Compounding Formula |  | I | I | I | I | I | I | I | I | I | I | II | I | I | I | I | II | I |
| Mooney viscosity | (ML 1 + 4, 100° C.) | 57 | 53 | 55 | 48 | 63 | 44 | 67 | 63 | 60 | 64 | 59 | 88 | 50 | 68 | 55 | 69 | 63 |
| Workability | (mark) | 3 | 3 | 3 | 3 | 2 | 3 | 3 | 3 | 3 | 3 | 3 | 1 | 3 | 2 | 3 | 3 | 3 |
| Tensile strength | (index) | 108 | 107 | 104 | 106 | 112 | 103 | 110 | 108 | 106 | 112 | 115 | 111 | 102 | 101 | 104 | 111 | 100 |
| 0° C. tanδ | (index) | 118 | 117 | 114 | 111 | 108 | 113 | 125 | 123 | 116 | 129 | 143 | 121 | 118 | 102 | 105 | 126 | 100 |
| 70° C. tanδ | (index) | 114 | 112 | 113 | 114 | 119 | 109 | 122 | 126 | 118 | 131 | 106 | 123 | 116 | 101 | 104 | 94 | 100 |
| Abrasion resistance | (index) | 104 | 105 | 104 | 99 | 107 | 104 | 105 | 103 | 105 | 107 | 113 | 106 | 103 | 94 | 103 | 103 | 100 |

The invention claimed is:

1. A method of producing a modified conjugated diene rubber, the method comprising:
   (a) reacting a conjugated diene polymer comprising an alkali metal or alkaline-earth metal active terminal, which polymer is obtained from polymerization of a conjugated diene compound or polymerization of a conjugated diene compound with an aromatic vinyl compound, with a hydrocarbyloxysilane compound comprising at least one or more of each of the following functional groups (I) and (II) to obtain a modified conjugated diene polymer comprising the functional group (II); and
   (b) mixing the modified conjugated diene polymer produced in (a) with an onium-forming agent,
   wherein:
   no hydrocarbyloxysilane compound is added in the process step (b), and the process step (b) does not include a situation in which the modified conjugated diene polymer produced in the process step (a), the onium-forming agent, and the hydrocarbyloxysilane compound are mixed together;
   the functional group (I) is a hydrocarbyloxysilyl group; and
   the functional group (II) is a nitrogen-containing group formed by substituting one protective group for one hydrogen atom of a secondary amine, a tertiary amino group, an imino group, a pyridyl group, a phosphorus-containing group formed by substituting two protective groups for two hydrogen atoms of a primary phosphine, a phosphorus-containing group formed by substituting one protective group for one hydrogen atom of a secondary phosphine, a tertiary phosphino group or a sulfur-containing group formed by substituting one protective group for one hydrogen atom of a thiol.

2. The method of claim 1, wherein the onium-forming agent is one or more compound(s) selected from the group consisting of a metal halide, an ester of an inorganic acid, an organic acid and derivatives of organic acids.

3. The method of claim 1, further comprising:
   (c) contacting a mixture obtained in the process step (b) with water.

4. The method of claim 1, wherein the modified conjugated diene rubber has an onium structure formed by the modified conjugated diene polymer.

5. A modified conjugated diene rubber obtained by the method of claim 1.

6. A rubber composition, comprising:
   the modified conjugated diene rubber of claim 5;
   silica, carbon black, or both; and
   a cross-linking agent.

7. A cross-linked rubber composition produced by cross-linking of the rubber composition of claim 6.

8. A tire made from the cross-linked rubber composition of claim 7.

9. The method of claim 1, wherein the modified conjugated diene rubber has a Mooney viscosity (ML 1+4, 100° C.) ranging from 30 to 150, a cold flow value of 1.5 mg/min or less, and a temporal stability (AML 1+4, 100° C.) of 6 or less.

10. The method of claim 1, wherein the modified conjugated diene rubber has a Mooney viscosity (ML 1+4, 100° C.) ranging from 40 to 63, a cold flow value of 0.3 mg/min or less, and a temporal stability (AML 1+4, 100° C.) of 3 or less.

* * * * *